US011086453B2

(12) United States Patent
Miranto et al.

(10) Patent No.: US 11,086,453 B2
(45) Date of Patent: Aug. 10, 2021

(54) LAYER FOR INDUCING VARYING DELAYS IN ULTRASONIC SIGNALS PROPAGATING IN ULTRASONIC SENSOR

(71) Applicant: QUALCOMM Incorporated, San Diego, CA (US)

(72) Inventors: James Anthony Miranto, Kenmore, NY (US); Jack Conway Kitchens, Town of Tonawanda, NY (US); Stephen Michael Gojevic, Lockport, NY (US); Todd Campbell, San Diego, CA (US); Stephen James Potter, San Diego, CA (US); Steven Pezanoski, Lakeside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 614 days.

(21) Appl. No.: 15/827,529

(22) Filed: Nov. 30, 2017

(65) Prior Publication Data
US 2019/0102046 A1 Apr. 4, 2019

Related U.S. Application Data

(60) Provisional application No. 62/565,479, filed on Sep. 29, 2017.

(51) Int. Cl.
*G06F 3/043* (2006.01)
*G01S 7/52* (2006.01)
(Continued)

(52) U.S. Cl.
CPC .......... *G06F 3/0436* (2013.01); *B06B 1/0207* (2013.01); *B06B 1/0622* (2013.01);
(Continued)

(58) Field of Classification Search
CPC combination set(s) only.
See application file for complete search history.

(56) References Cited

U.S. PATENT DOCUMENTS

| 5,103,129 A | 4/1992 | Slayton et al. |
| 5,354,992 A | 10/1994 | Thompson et al. |

(Continued)

FOREIGN PATENT DOCUMENTS

| CN | 106886753 A | 6/2017 |
| CN | 107194384 A | 9/2017 |

(Continued)

OTHER PUBLICATIONS

International Search Report and Written Opinion—PCT/US2018/053189—ISA/EPO—dated Jan. 30, 2019.

*Primary Examiner* — Isam A Alsomiri
*Assistant Examiner* — Amie M Ndure
(74) *Attorney, Agent, or Firm* — Qualcomm Incorporated

(57) ABSTRACT

An apparatus includes an ultrasonic transmitter, an ultrasonic receiver, and an acoustic delay gradient layer disposed in an acoustic path between the ultrasonic transmitter and the ultrasonic receiver. The acoustic delay gradient layer is configured to cause a reflection from a platen interface of the transmitted ultrasonic signal to reach the first receiver region at a first time and the reflection from the platen interface of the transmitted ultrasonic signal to reach the second receiver region at a second time that is different from the first time. The apparatus can further include a controller configured to set for a first region or portion of the receiver, a first range gate window (RGW). The controller is also configured to set, for a second region or portion of the receiver, a second RGW, and to establish a first temporal delay between the first RGW and the second RGW.

30 Claims, 18 Drawing Sheets

(51) Int. Cl.
*B06B 1/06* (2006.01)
*G06F 1/16* (2006.01)
*G01S 15/89* (2006.01)
*G06F 3/041* (2006.01)
*B06B 1/02* (2006.01)
*G01H 11/08* (2006.01)
*G06K 9/00* (2006.01)
*H04L 29/06* (2006.01)
*H04W 12/06* (2021.01)

(52) U.S. Cl.
CPC .......... *B06B 1/0629* (2013.01); *B06B 1/0688* (2013.01); *G01H 11/08* (2013.01); *G01S 7/5202* (2013.01); *G01S 7/52026* (2013.01); *G01S 7/52079* (2013.01); *G01S 7/52085* (2013.01); *G01S 15/8913* (2013.01); *G01S 15/8925* (2013.01); *G06F 1/169* (2013.01); *G06F 3/0412* (2013.01); *G06F 3/0433* (2013.01); *G06F 3/04166* (2019.05); *G06K 9/0002* (2013.01); *H04L 63/0861* (2013.01); *H04W 12/06* (2013.01); *B06B 2201/20* (2013.01); *B06B 2201/56* (2013.01); *B06B 2201/70* (2013.01); *G06F 1/1626* (2013.01); *G06F 2203/04104* (2013.01)

(56) References Cited

U.S. PATENT DOCUMENTS

| | | |
|---|---|---|
| 7,037,268 B1 | 5/2006 | Sleva et al. |
| 10,001,552 B2 | 6/2018 | Panchawagh et al. |
| 2004/0015079 A1* | 1/2004 | Berger .................. A61B 18/02 600/437 |
| 2004/0190376 A1 | 9/2004 | Hulden et al. |
| 2008/0028868 A1 | 2/2008 | Konzelmann et al. |
| 2008/0062151 A1* | 3/2008 | Kent ...................... G06F 3/0436 345/177 |
| 2008/0110263 A1* | 5/2008 | Klessel ............... G01S 7/52085 73/602 |
| 2010/0286522 A1* | 11/2010 | Beach ...................... A61B 8/08 600/441 |
| 2011/0248160 A1 | 10/2011 | Belov et al. |
| 2013/0144165 A1* | 6/2013 | Ebbini ................ G01S 7/52046 600/439 |
| 2014/0278221 A1 | 9/2014 | Troy et al. |
| 2015/0016223 A1 | 1/2015 | Dickinson et al. |
| 2015/0198699 A1 | 7/2015 | Kuo et al. |
| 2016/0051321 A1 | 2/2016 | Salahieh et al. |
| 2017/0090024 A1 | 3/2017 | Kitchens, II et al. |
| 2017/0090028 A1 | 3/2017 | Djordjev et al. |
| 2017/0254887 A1 | 9/2017 | Sapozhnikov et al. |
| 2018/0031686 A1 | 2/2018 | Kuo et al. |
| 2018/0046836 A1 | 2/2018 | Hinger et al. |
| 2018/0060635 A1 | 3/2018 | Li et al. |
| 2018/0140278 A1 | 5/2018 | Bromberg et al. |
| 2018/0310916 A1 | 11/2018 | Loebl et al. |
| 2018/0329272 A1 | 11/2018 | Muir et al. |
| 2019/0101437 A1 | 4/2019 | Miranto et al. |
| 2019/0102045 A1 | 4/2019 | Miranto et al. |
| 2019/0354743 A1 | 11/2019 | Hinger et al. |

FOREIGN PATENT DOCUMENTS

| | | | |
|---|---|---|---|
| GB | 772083 A | 4/1957 | |
| WO | WO 2001-005522 A1 * | 7/2000 | ............... B06B 1/06 |
| WO | 0105522 A1 | 1/2001 | |
| WO | 2016061410 A1 | 4/2016 | |
| WO | 2017052836 A1 | 3/2017 | |
| WO | 2017066612 A1 | 4/2017 | |

* cited by examiner

LAYER FOR INDUCING VARYING DELAYS IN ULTRASONIC SIGNALS PROPAGATING IN ULTRASONIC SENSOR

CROSS-REFERENCE TO RELATED APPLICATIONS

This disclosure claims priority to U.S. Provisional Patent Application Ser. No. 62/565,479, filed on Sep. 29, 2017, entitled "SLIDING RANGE GATE FOR LARGE AREA ULTRASONIC SENSOR," assigned to the assignee hereof and incorporated herein by reference in its entirety. The present application may also be considered to be related to co-pending U.S. patent application Ser. No. 15/827,528, filed on Nov. 30, 2017, entitled "SYSTEM AND METHOD FOR ULTRASONIC SENSING," and co-pending U.S. patent application Ser. No. 15/828,187, filed on Nov. 30, 2017, entitled "SLIDING RANGE GATE FOR LARGE AREA ULTRASONIC SENSOR," both assigned to the assignee hereof.

TECHNICAL FIELD

This disclosure relates to ultrasonic transducer arrays and, more particularly to a large area array of ultrasonic transducers.

BACKGROUND

Ultrasonic sensor systems may use a transmitter to generate and send an ultrasonic wave through a transmissive medium and towards a platen interface where an object in contact or near the platen interface can be detected and/or imaged. The ultrasonic transmitter may be operatively coupled with an ultrasonic sensor array configured to detect portions of the ultrasonic wave that are reflected from the platen interface.

Piezoelectric ultrasonic transducers are attractive candidates for such applications and may include piezoelectric micromechanical ultrasonic transducers (PMUTs) configured as a multilayer stack that includes a piezoelectric layer stack. The piezoelectric layer stack may include a layer of piezoelectric material such as, for example, a layer of polyvinylidene fluoride (PVDF) or a PVDF copolymer. The piezoelectric layer may convert vibrations caused by ultrasonic reflections into electrical output signals. In some implementations, the ultrasonic sensor system further includes a thin-film transistor (TFT) layer that may include an array of sensor pixel circuits that may, for example, amplify electrical output signals generated by the piezoelectric layer.

In some applications, a two-dimensional array of a large number of PMUT elements (a "PMUT array") may be contemplated. For example an array of 1-5 million PMUTs may be contemplated for some large area ultrasonic sensors. In the absence of the presently disclosed techniques, the TFT layer of such a large area ultrasonic sensors may limit the current to the pixel elements and degrade transmission of the signals generated by the piezoelectric layer, due to narrow pixel to pixel address and signal traces.

As a result, methods and structures to reduce current spikes at an ultrasonic receiver converting ultrasonic signals to electrical signals are desirable, particularly for large PMUT arrays.

SUMMARY

In various implementations, an apparatus can comprise an ultrasonic transmitter, an ultrasonic receiver, and an acoustic delay gradient layer. In some implementations, the apparatus can further include a controller. The ultrasonic transmitter can be configured to transmit an ultrasonic signal towards a platen interface. The ultrasonic receiver can comprise a plurality of receiver regions within the ultrasonic receiver, the plurality of receiver regions including at least a first receiver region and a second receiver region, where the ultrasonic receiver is configured to receive a reflection of the transmitted ultrasonic signal from the platen interface. The acoustic delay gradient layer can be disposed in an acoustic path between the ultrasonic transmitter and the ultrasonic receiver, where the acoustic delay gradient layer is configured to cause the reflection from the platen interface of the transmitted ultrasonic signal to reach the first receiver region at a first time and the reflection from the platen interface of the transmitted ultrasonic signal to reach the second receiver region at a second time that is different from the first time. In various implementations, the acoustic delay gradient layer can comprise a tapered layer having a taper angle, a stepped layer, or a non-tapered layer. In implementations with a tapered layer, the acoustic delay gradient layer can have a taper angle causing the reflection from the platen interface to reach the first receiver region after propagating over a first physical distance and the tapered layer causing the reflection from the platen interface to reach the second receiver region after propagating over a second physical distance different from the first physical distance. In some implementations, the acoustic delay gradient layer can comprise a first acoustic delay gradient layer region corresponding to the first receiver region and a second acoustic delay gradient layer region corresponding to the second receiver region and wherein a first speed of sound propagating in the first acoustic delay gradient layer region and a second speed of sound propagating in the second acoustic delay gradient layer region are different. In some implementations, the acoustic delay gradient layer is disposed between the ultrasonic transmitter and the ultrasonic receiver. In some implementations, the ultrasonic transmitter is a non-segmented transmitter configured to transmit the ultrasonic signal towards the platen interface across an entirety of the non-segmented transmitter simultaneously. In implementations with a controller, the controller can be configured to enable the first receiver region to measure the reflection of the transmitted ultrasonic signal during a first window beginning at a first window begin time and to enable the second receiver region to measure the reflection of the transmitted ultrasonic signal during a second window beginning at a second window begin time different from the first window begin time. In some implementations, the apparatus is disposed within a mobile device.

In various implementations, a method for operating an ultrasonic sensor can comprise transmitting, by an ultrasonic transmitter of the ultrasonic sensor, an ultrasonic signal toward a platen interface of the ultrasonic sensor along an acoustic path that includes an acoustic delay gradient layer. The method can then proceed by receiving a reflection of the transmitted ultrasonic signal reflected from the platen interface at a first receiver region of an ultrasonic receiver of the ultrasonic sensor at a first time and receiving the reflection of the transmitted ultrasonic signal reflected from the platen interface at a second receiver region of the ultrasonic receiver at a second time different from the first time. In some implementations, the transmitting the ultrasonic signal towards the platen interface can comprise transmitting the ultrasonic signal through a tapered acoustic delay gradient layer having a taper angle, the taper angle causing the reflection from the platen interface to reach the first receiver region after propagating over a first physical distance and the tapered angle causing the reflection from the platen interface to reach the second receiver region after propagating over a second physical distance different from the first physical distance. Additionally or alternatively, the transmitting the ultrasonic signal toward the platen interface can comprise transmitting the ultrasonic signal through a first acoustic delay gradient layer region corresponding to the first receiver region at a first speed of sound and transmitting the ultrasonic signal through a second acoustic delay gradient layer region corresponding to the second receiver region at a second speed of sound different from the first speed of sound. In some implementations, the transmitting the ultrasonic signal toward the platen interface can comprise transmitting the ultrasonic signal through the acoustic delay gradient layer disposed between the ultrasonic transmitter and the ultrasonic receiver. In some implementations, the transmitting the ultrasonic signal toward the platen interface can comprise transmitting the ultrasonic transmitter using a non-segmented transmitter configured to transmit the ultrasonic signal towards the platen interface across an entirety of the non-segmented transmitter simultaneously. In some implementations, the receiving the reflection of the transmitted ultrasonic signal at the first receiver region at the first time can comprise enabling the first receiver region to measure the reflection of the transmitted ultrasonic signal during a first window beginning at a first window begin time and the receiving the reflection of the transmitted ultrasonic signal at the second receiver region at the second time can comprise enabling the second receiver region to measure the reflection of the transmitted ultrasonic signal during a second window beginning at a second window begin time different from the first window begin time.

In various implementations, a mobile device can comprise means for transmitting an ultrasonic signal toward a platen interface of an ultrasonic sensor along an acoustic path that includes means for introducing an acoustic delay gradient, means for receiving a reflection of the transmitted ultrasonic signal reflected from the platen interface at a first receiver region of an ultrasonic receiver of the ultrasonic sensor at a first time, and means for receiving the reflection of the transmitted ultrasonic signal reflected from the platen interface at a second receiver region of the ultrasonic receiver at a second time different from the first time. In some implementations, the means for introducing the acoustic delay gradient can comprise a means for causing the reflection from the platen interface to reach the first receiver region after propagating over a first physical distance and means for causing the reflection from the platen interface to reach the second receiver region after propagating over a second physical distance different from the first physical distance. In some implementations, the means for introducing the acoustic delay gradient can comprise a tapered acoustic delay gradient layer. In some implementations, the means for introducing the acoustic delay gradient can comprise a means for causing the ultrasonic signal to travel at a first speed of sound along the acoustic path to the first receiver region and a means for causing the ultrasonic signal to travel at a second speed of sound different from the first speed of sound along the acoustic path to the second receiver region. In some implementations, the means for causing the ultrasonic signal to travel at the first speed of sound along the acoustic path to the first receiver region can comprise a first acoustic delay gradient layer region comprising a first material and the means for causing the ultrasonic signal to travel at a second speed of sound along the acoustic path to the second receiver region can comprise a second acoustic delay gradient layer region comprising a second material different from the first material. In some implementations, the means for receiving the reflection of the transmitted ultrasonic signal at the first receiver region at the first time can comprise means for enabling the first region to measure the reflection of the ultrasonic signal during a first window beginning at a first window begin time and the means for receiving the reflection of the transmitted ultrasonic signal at the second receiver region at the second time can comprise means for enabling the second region to measure the reflection of the ultrasonic signal during a second window beginning at a second window begin time, different from the first window begin time.

In various implementations, a non-transitory computer readable medium can store instructions for execution by one or more processors of a mobile device to perform operations. The operations can comprise controlling an ultrasonic transmitter of an ultrasonic sensor to transmit an ultrasonic signal toward a platen interface of the ultrasonic sensor along an acoustic path that includes an acoustic delay gradient layer, enabling a first region of an ultrasonic receiver of the ultrasonic sensor to measure a reflection of the transmitted ultrasonic signal during a first window beginning at a first window begin time, and enabling a second region of the ultrasonic receiver of the ultrasonic sensor to measure the reflection of the transmitted ultrasonic signal during a second window beginning at a second window begin time different from the first window begin time. In some implementations, the operations can comprise enabling the first region of the ultrasonic receiver of the ultrasonic sensor to measure the reflection of the transmitted ultrasonic signal during the first window beginning at the first window begin time by controlling the application of a sample voltage to a receiver bias electrode corresponding to the first receiver region during the first window, and enabling the second region of the ultrasonic receiver of the ultrasonic sensor to measure the reflection of the transmitted ultrasonic signal during the second window beginning at the second window begin time by controlling the application of the sample voltage to a receiver bias electrode corresponding to the second receiver region during the second window. In some implementations, the operations can comprise instructing a non-segmented transmitter to transmit the ultrasonic signal across an entirety of the non-segmented transmitter simultaneously.

BRIEF DESCRIPTION OF THE DRAWINGS

Details of one or more implementations of the subject matter described in this specification are set forth in this disclosure and the accompanying drawings. Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting. Like reference numbers and designations in the various drawings indicate like elements.

DETAILED DESCRIPTION

Figure 1:
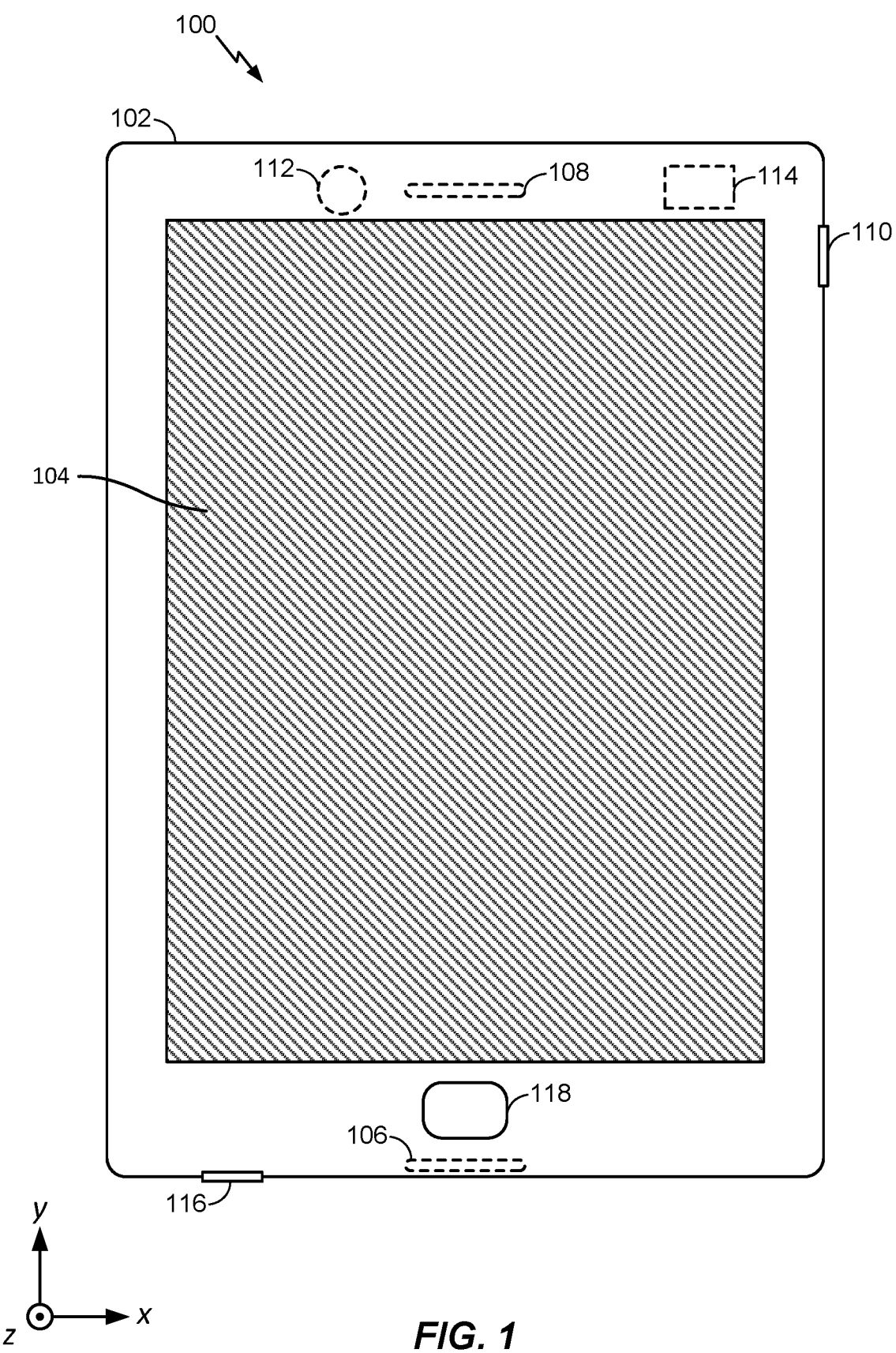
FIG. 1 shows a front view of a diagrammatic representation of an example of an electronic device that includes an ultrasonic sensing system according to some implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a sensor system. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, steering wheels, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automated teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

In some implementations, ultrasonic sensor systems include piezoelectric material for the transmission and receiving of ultrasonic waves.

For example, a voltage applied across piezoelectric material corresponding to a transmitter may result in the piezoelectric material stretching or contracting, e.g., being deformed such that the material is strained in response to the applied voltage, resulting in the generation of the ultrasonic wave. The reflected signals (e.g., the reflected portions of the ultrasonic wave) may result in the stretching or contracting of piezoelectric material corresponding to a receiver. This results in the generation of a surface charge, and therefore, a voltage across the piezoelectric material that may be used as an electrical output signal representing a portion of raw image data that represents fingerprint image data.

Some implementations of the subject matter described in this disclosure provide circuitry for an ultrasonic sensing system. Features of related ultrasonic sensing techniques are described in U.S. patent application Ser. No. 15/292,057, filed Feb. 22, 14, 2017, U.S. Patent Publication No. 2017/0110504, owned by the assignee of the present disclosure and entitled "INTEGRATED PIEZOELECTRIC MICROMECHANICAL ULTRASONIC TRANSDUCER PIXEL AND ARRAY," and in U.S. patent application Ser. No. 15/704,337, filed Sep. 14, 2017, U.S. Pat. No. 2019/0079186, owned by the assignee of the present disclosure and entitled "ULTRASONIC TRANSDUCER PIXEL READOUT CIRCUITRY AND METHODS FOR ULTRASONIC PHASE IMAGING," the disclosures of which are hereby incorporated by reference in their entirety into the present application.

In some implementations, the ultrasonic sensing system includes an M×N array of pixels, i.e., M rows by N columns of pixels. In some implementations, values of M and N are each greater than 1,000. For example, a 1200×1600 array of nearly two million pixels may be contemplated. As a further example, a 1600×1800 array of nearly three million pixels may be contemplated. It will be appreciated that, assuming a typical pixel spacing on the order of 400-600 pixels per inch, the ultrasonic sensing systems contemplated by the present disclosure can accommodate an imaging area on the order of 5-20 square inches. Such large area ultrasonic sensing systems may be desirable for simultaneous imaging of multiple fingerprints, palm or hand prints, for example.

Some implementations of the subject matter described in this disclosure may be practiced to realize one or more of the following potential advantages. The disclosed structures (including acoustic delay layers) and techniques introduce small temporal delays between at least portions of outputted receiver signals. As a result, a load on the TFT layer signal traces may be significantly reduced large number of pixels may output receiver signals simultaneously or nearly simultaneously with a result that at least some signals suffer degradation due to limitations of the TFT layer signal traces. In addition, by implementing a sliding range gate window (RGW), timing of the RGW may be controlled so as to compensate for the temporal delays, provide that the RGW window remains well aligned in a desired relationship to returned acoustic signals.

FIG. 1 shows a front view of a diagrammatic representation of an example of an electronic device 100 that includes an ultrasonic sensing system according to some implementations. The electronic device 100 may be representative of, for example, various portable computing devices such as cellular phones, smartphones, multimedia devices, personal gaming devices, tablet computers and laptop computers, among other types of portable computing devices including mobile devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications. Additionally, various implementations described herein are not limited in application to devices that include displays.

In the illustrated implementation, the electronic device 100 includes a housing (or "case") 102 within which various circuits, sensors and other electrical components may be disposed. In the illustrated implementation, the electronic device 100 also includes a display (that may be referred to herein as a "touchscreen display" or a "touch-sensitive display") 104. The display 104 may generally be representative of any of a variety of suitable display types that employ any of a variety of suitable display technologies. For example, the display 104 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The electronic device 100 may include various other devices or components for interacting with, or otherwise communicating information to or receiving information from, a user. For example, the electronic device 100 may include one or more microphones 106, one or more speakers 108, and in some cases one or more at least partially mechanical buttons 110. The electronic device 100 may include various other components enabling additional features such as, for example, one or more video or still-image cameras 112, one or more wireless network interfaces 114 (for example, Bluetooth, WiFi or cellular) and one or more non-wireless interfaces 116 (for example, a universal serial bus (USB) interface or an high-definition multimedia interface (HDMI) interface).

The electronic device 100 may include an ultrasonic sensing system 118 capable of imaging an object signature, such as a fingerprint, palm print or handprint. In some implementations, the ultrasonic sensing system 118 may function as a touch-sensitive control button. In some implementations, a touch-sensitive control button may be implemented with a mechanical or electrical pressure-sensitive system that is positioned under or otherwise integrated with the ultrasonic sensing system 118. In other words, in some implementations, a region occupied by the ultrasonic sensing system 118 may function both as a user input button to control the electronic device 100 as well as a sensor to enable security features such as user authentication based on, for example, a fingerprint, palm print or handprint. In implementations where the ultrasonic sensing system 118 is large enough, it may serve as a touch-sensitive control screen. If integrated with display 104, the ultrasonic sensing system 118 can serve as a component within a touch screen.

Figure 2A:
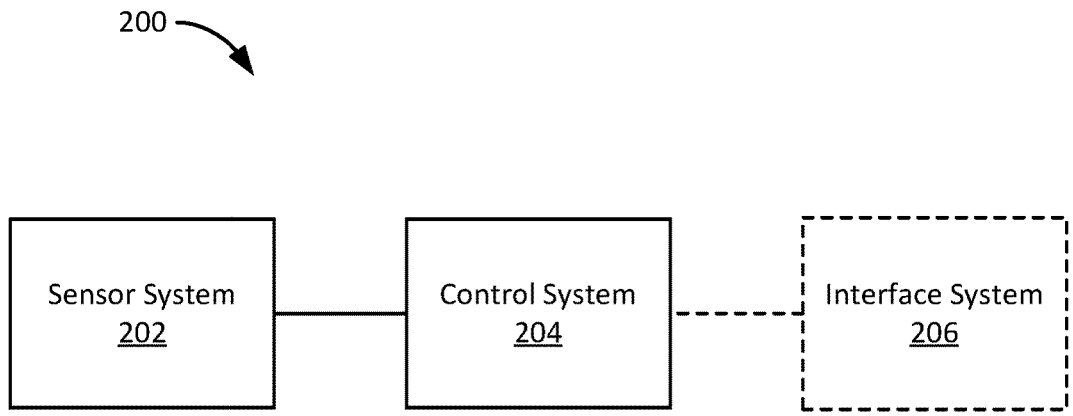
FIG. 2A shows a block diagram representation of components of an example of an ultrasonic sensing system, according to some implementations.

FIG. 2A shows a block diagram representation of components of an example of an ultrasonic sensing system, according to some implementations. In the illustrated implementation, an ultrasonic sensing system 200 includes a sensor system 202 and a control system 204 electrically coupled with the sensor system 202. The sensor system 202 may be capable of scanning a target object and providing raw measured image data usable to obtain an object signature of, for example, a human appendage, such as one or more fingers or toes, a palm, hand or foot. The sensor system 202 can include a stack of layers as described with reference to FIGS. 8A and 8B. The control system 204 may be capable of controlling the sensor system 202 and processing the raw measured image data received from the sensor system 202. The control system 204 can include receiver control circuitry capable of biasing different regions or portions of the receiver array such that different portions of the receiver array sample reflected ultrasonic signals at different times as described elsewhere herein with reference to a sliding range gate and range gate delays (RGDs) of different duration.

In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices or other systems external to the ultrasonic sensing system 200.

Figure 2B:
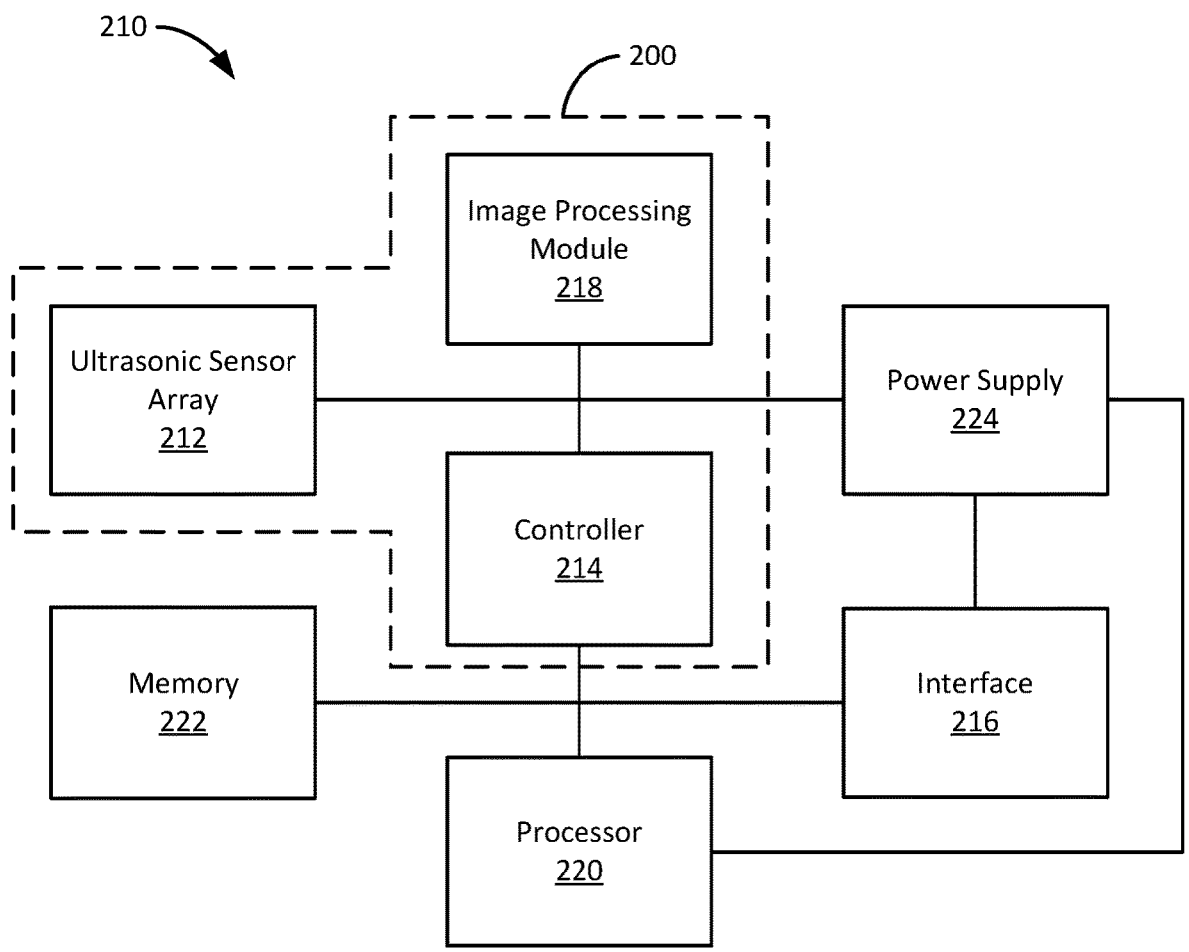
FIG. 2B shows a block diagram representation of components of an example of an electronic device, according to some implementations.

FIG. 2B shows a block diagram representation of components of an example of an electronic device, according to some implementations. In the illustrated example, an electronic device 210 includes the ultrasonic sensing system 200 of FIG. 2A. For example, the electronic device 210 may be a block diagram representation of the electronic device 100 shown in and described with reference to FIG. 1 above. The sensor system 202 of the ultrasonic sensing system 200 of the electronic device 210 may be implemented with an ultrasonic sensor array 212. The control system 204 of the ultrasonic sensing system 200 may be implemented with a controller 214 that is electrically coupled with the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

For example, the controller 214 can be in communication with a non-transitory computer readable medium storing instructions for execution by one or more processors, such as the controller 214 and possible additional processors such as processor 220, to perform operations such as those described with reference to FIG. 8D. For example, the instructions can include instructions to control an ultrasonic transmitter to transmit an ultrasonic signal as described elsewhere herein. Furthermore, the instructions can also include instructions to enable different regions of the receiver to measure the reflection of the ultrasonic signal transmitted by the transmitter at different times, for example for a receiver with two regions, a first region can be enabled for a first window beginning at a first window begin time and a second region can be enabled for a second window beginning at a second window begin time different from the first window begin time. In one example, this can comprise the controller 214 configured to control the voltages applied to the receiver bias electrode(s) to control when a region of the receiver will sample the ultrasonic signal, thereby converting it to an electrical signal. When the ultrasonic sensor is configured such that the reflected ultrasonic signal to be sampled arrives at different regions or portions of the receiver at different times, the controller 214 may then be configured to control the application of a sample voltage level such that the sample voltage level is applied to the receiver bias electrodes associated with the different regions or portions at different times as well. Hence, for example, when the ultrasonic signal is to be received by a first region or portion of the receiver at a first time and to be received by a second region or portion of the receiver at a second time different from the first time, the controller 214 can control the application of the sample voltage such that the sample voltage is applied to the bias electrode corresponding to the first region or portion of the receiver for a first window including the first time and to control the application of the sample voltage such that the sample voltage is applied to the bias electrode corresponding to the second region or portion of the receiver for a second window including the second time. While the first window and the second window may overlap in time, in some implementations, the first window begins at a time (first window begin time) that is different from the time that the second window begins (second window begin time). The first and second windows can be examples of a range gate window (RGW) period. A block voltage can be applied to the receiver bias electrode before the sample voltage is applied. As will be described in greater detail below, the time during which the block voltage is applied can be referred to as a range gate delay (RGD) period. As described above, since the first window begins at a time that is different from the time that the second window begins, therefore, the controller 214 can be configured to control the application of a block voltage to the receiver bias electrode corresponding to the first region or portion of the receiver for a first range gate delay period and to control the application of the block voltage to the receiver bias electrode corresponding to the second region or portion of the receiver for a second range gate delay period that is different than the first range gate delay period. Additionally, the controller 214 can be configured to control the transmitter to transmit an ultrasonic signal. In implementations where the controller 214 controls an ultrasonic sensor that includes a stack similar to the stack described with reference to FIGS. 8A and 8B, the ultrasonic transmitter is configured to transmit the ultrasonic signal toward a platen interface of the ultrasonic sensor along an acoustic path that includes an acoustic delay gradient layer, as will be described further below.

The ultrasonic sensing system 200 of FIG. 2B may include an image processing module 218. In some implementations, raw measured image data provided by the ultrasonic sensor array 212 may be sent, transmitted, communicated or otherwise provided to the image processing module 218. The image processing module 218 may include any suitable combination of hardware, firmware and software configured, adapted or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive or active analog filters, among others. In some implementations, one or more of such circuits or circuit components may be integrated within the controller 214, for example, where the controller 214 is implemented as a system-on-chip (SoC) or system-in-package (SIP). In some implementations, one or more of such circuits or circuit components may be integrated within a DSP included within or coupled with the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general purpose processor or a DSP).

In some implementations, in addition to the ultrasonic sensing system 200, the electronic device 210 may include a separate processor 220, a memory 222, an interface 216 and a power supply 224. In some implementations, the controller 214 of the ultrasonic sensing system 200 may control the ultrasonic sensor array 212 and the image processing module 218, and the processor 220 of the electronic device 210 may control other components of the electronic device 210. In some implementations, the processor 220 communicates data to the controller 214 including, for example, instructions or commands. In some such implementations, the controller 214 may communicate data to the processor 220 including, for example, raw or processed image data. In implementations where the controller 214 communicates processed image data to the processor 220, it is understood that some post-processing steps may be performed by the processor 220, such as, for example, background subtraction, gain or offset adjustment to further enhance the images, and the like. It should also be understood that, in some other implementations, the functionality of the controller 214 may be implemented entirely, or at least partially, by the processor 220. In some such implementations, a separate controller 214 for the ultrasonic sensing system 200 may not be required because the functions of the controller 214 may be performed by the processor 220 of the electronic device 210.

Depending on the implementation, one or both of the controller 214 and processor 220 may store data in the memory 222. For example, the data stored in the memory 222 may include raw measured image data, filtered or otherwise processed image data, an estimated point spread function (PSF) or estimated image data, and final refined PSF or final refined image data. When used, the PSF can be utilized as a means to reduce blur in images, for example, as a post-processing step. Such post-processing can entail using multiple raw images from the sensor (for example, communicated by the controller 214 to the processor 220) captured at various operating points, such as various frequencies, RGWs, RGDs, timings, and the like, and using the multiple raw images in post-processing steps by the processor 220 to generate an enhanced image, for example, an image with reduced blur. The memory 222 may store processor-executable code or other executable computer-readable instructions capable of execution by one or both of the controller 214 and the processor 220 to perform various operations (or to cause other components such as the ultrasonic sensor array 212, the image processing module 218, or other modules to perform operations), including any of the calculations, computations, estimations or other determinations described herein (including those presented in any of the equations below). For example, the operations can include any of the functionality of the controller described elsewhere herein. It should also be understood that the memory 222 may collectively refer to one or more memory devices (or "components"). For example, depending on the implementation, the controller 214 may have access to and store data in a different memory device than the processor 220. In some implementations, one or more of the memory components may be implemented as a NOR- or NAND-based Flash memory array. In some other implementations, one or more of the memory components may be implemented as a different type of non-volatile memory. Additionally, in some implementations, one or more of the memory components may include a volatile memory array such as, for example, a type of random access memory (RAM).

In some implementations, the controller 214 or the processor 220 may communicate data stored in the memory 222 or data received directly from the image processing module 218 through an interface 216. For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server.

A power supply 224 may provide power to some or all of the components in the electronic device 210. The power supply 224 may include one or more of a variety of energy storage devices. For example, the power supply 224 may include a rechargeable battery, such as a nickel-cadmium battery or a lithium-ion battery. Additionally or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the electronic device 210. Additionally or alternatively, the power supply 224 may be wirelessly chargeable.

As used hereinafter, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below, for example, with reference to FIG. 8D, as being performed by or using a processing unit may be performed by one or more of a controller of the ultrasonic system, an image processing module, or a separate processor of a device that includes the ultrasonic sensing system.

Figure 3A:
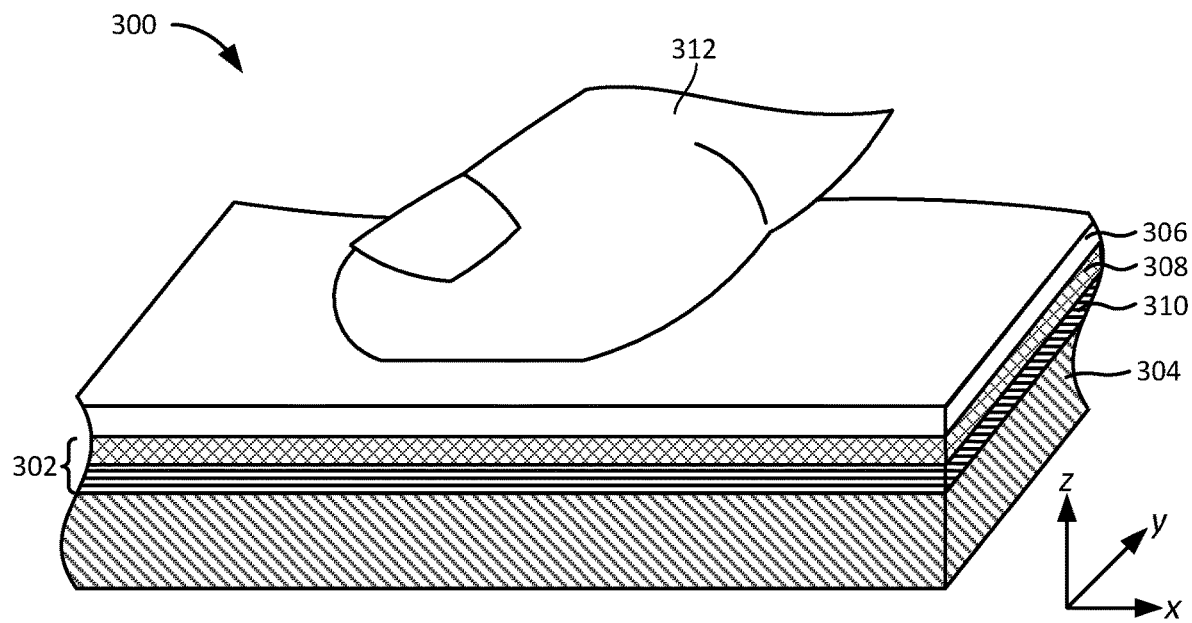
FIG. 3A shows a cross-sectional of an example of an ultrasonic sensing system, according to some implementations.
Figure 3B:
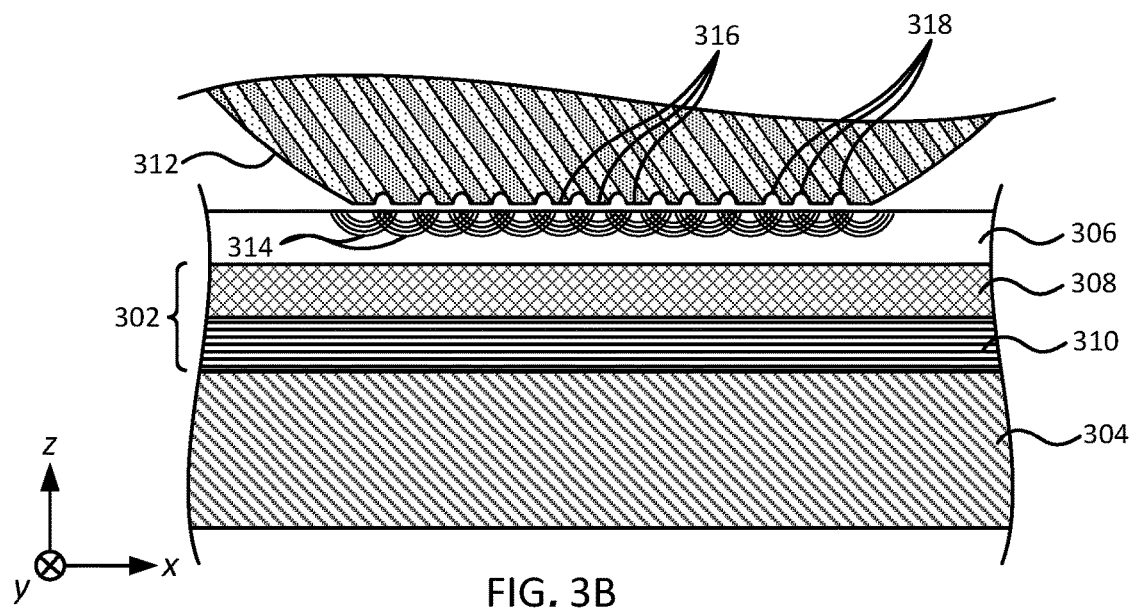
FIG. 3B shows an enlarged cross-sectional side view of the ultrasonic sensing system of FIG. 3A, according to some implementations.

FIG. 3A shows a cross-sectional of an example of an ultrasonic sensing system according to some implementations. FIG. 3B shows an enlarged cross-sectional side view of the ultrasonic sensing system of FIG. 3A according to some implementations. In the illustrated example, the ultrasonic sensing system 300 may implement the ultrasonic sensing system 118 described with reference to FIG. 1 or the ultrasonic sensing system 200 shown and described with reference to FIGS. 2A and 2B. The ultrasonic sensing system 300 may include an ultrasonic transducer 302 that overlies a substrate 304 and that underlies a platen (a "cover plate" or "cover glass") 306. The ultrasonic transducer 302 may include both an ultrasonic transmitter 308 and an ultrasonic receiver 310.

The ultrasonic transmitter 308 may be configured to generate ultrasonic waves towards the platen 306, and a target object 312 positioned on the upper surface of the platen 306. In the illustrated implementation the object 312 is depicted as a finger, but any appendage or body part may be contemplated by the present techniques, as well as any other natural or artificial object. In some implementations, the ultrasonic transmitter 308 may more specifically be configured to generate ultrasonic plane waves towards the platen 306. In some implementations, the ultrasonic transmitter 308 includes a layer of piezoelectric material such as, for example, polyvinylidene fluoride (PVDF) or a PVDF copolymer such as polyvinylidene fluoride-trifluoroethylene (PVDF-TrFE). For example, the piezoelectric material of the ultrasonic transmitter 308 may be configured to convert electrical signals provided by the controller of the ultrasonic sensing system into a continuous or pulsed sequence of ultrasonic plane waves at a scanning frequency. In some implementations, the ultrasonic transmitter 308 may additionally or alternatively include capacitive ultrasonic devices.

Figure 4:
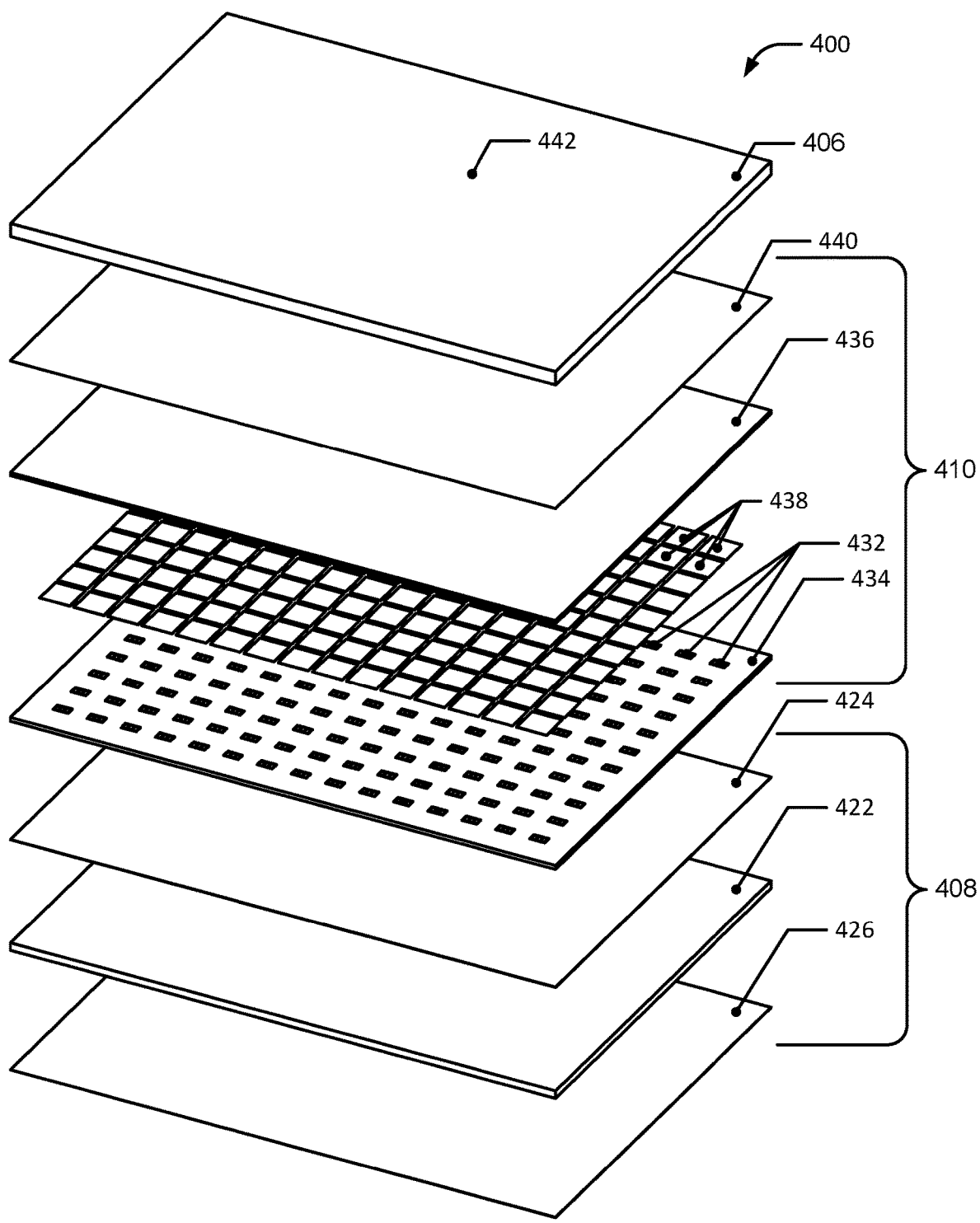
FIG. 4 shows an exploded projection view of an example of components of an example ultrasonic sensing system according to another implementation.

The ultrasonic receiver 310 may be configured to detect ultrasonic reflections 314 resulting from interactions of the ultrasonic waves transmitted by the ultrasonic transmitter 308 with ridges 316 and valleys 318 defining surface texture of the target object 312 being scanned. In some implementations, the ultrasonic transmitter 308 overlies the ultrasonic receiver 310 as, for example, illustrated in FIGS. 3A and 3B. In some other implementations, the ultrasonic receiver 310 may overlie the ultrasonic transmitter 308 (as shown in FIG. 4 described below). The ultrasonic receiver 310 may be configured to generate and output electrical output signals corresponding to the detected ultrasonic reflections. In some implementations, the ultrasonic receiver 310 may include a second piezoelectric layer different than the piezoelectric layer of the ultrasonic transmitter 308. For example, the piezoelectric material of the ultrasonic receiver 310 may be any suitable piezoelectric material such as, for example, a layer of PVDF or a PVDF copolymer. The piezoelectric layer of the ultrasonic receiver 310 may convert vibrations caused by the ultrasonic reflections into electrical output signals. In some implementations, the ultrasonic receiver 310 further includes a thin-film transistor (TFT) layer. In some such implementations, the TFT layer may include an array of sensor pixel circuits configured to amplify the electrical output signals generated by the piezoelectric layer of the ultrasonic receiver 310. The amplified electrical signals provided by the array of sensor pixel circuits may then be provided as raw measured image data to the processing unit for use in processing the image data, identifying a fingerprint associated with the image data, and in some applications, authenticating a user associated with the fingerprint. In some implementations, a single piezoelectric layer may serve as the ultrasonic transmitter 308 and the ultrasonic receiver 310. In some implementations, the substrate 304 may be a glass, plastic or silicon substrate upon which electronic circuitry may be fabricated. In some implementations, an array of sensor pixel circuits and associated interface circuitry of the ultrasonic receiver 310 may be configured from complementary metal-oxide-semiconductor (CMOS) circuitry formed in or on the substrate 304. In some implementations, the substrate 304 may be positioned between the platen 306 and the ultrasonic transmitter 308 and/or the ultrasonic receiver 310. In some implementations, the substrate 304 may serve as the platen 306. One or more protective layers, acoustic matching layers, anti-smudge layers, adhesive layers, decorative layers, conductive layers or other coating layers (not shown) may be included on one or more sides of the substrate 304 and the platen 306.

The platen 306 may be formed of any suitable material that may be acoustically coupled with the ultrasonic transmitter 308. For example, the platen 306 may be formed of one or more of glass, plastic, ceramic, sapphire, metal or metal alloy. In some implementations, the platen 306 may be a cover plate such as, for example, a cover glass or a lens glass of an underlying display. In some implementations, the platen 306 may include one or more polymers, such as one or more types of parylene, and may be substantially thinner. In some implementations, the platen 306 may have a thickness in the range of about 10 microns (µm) to about 1,000 µm or more.

FIG. 4 shows an exploded projection view of an example of components of an example ultrasonic sensing system according to another implementation. In the illustrated implementation, the ultrasonic sensing system 400 includes an ultrasonic transmitter 408. The ultrasonic transmitter 408 may include a substantially planar piezoelectric transmitter layer 422 capable of functioning as a plane wave generator. Ultrasonic waves may be generated by applying a voltage across the piezoelectric transmitter layer 422 to expand or contract the layer, depending upon the voltage signal applied, thereby generating a plane wave. In this example, the processing unit (not shown) is capable of causing a transmitter excitation voltage to be applied across the piezoelectric transmitter layer 422 via a first transmitter electrode 424 and a second transmitter electrode 426. The first and second transmitter electrodes 424 and 426 may be metallized electrodes, for example, metal layers that coat opposing sides of the piezoelectric transmitter layer 422. As a result of the piezoelectric effect, the applied transmitter excitation voltage causes changes in the thickness of the piezoelectric transmitter layer 422, and in such a fashion, generates ultrasonic waves at the frequency of the transmitter excitation voltage.

The ultrasonic waves may travel towards an object to be imaged ("target object," not illustrated), passing through the platen 406. A portion of the ultrasonic waves not absorbed or transmitted by the target object may be reflected back through the platen 406 and received by the ultrasonic receiver 410, which, in the implementation illustrated in FIG. 4, overlies the ultrasonic transmitter 408. The ultrasonic receiver 410 may include an array of sensor pixel circuits 432 disposed on a substrate 434 and a piezoelectric receiver layer 436. In some implementations, each sensor pixel circuit 432 may include one or more TFT or CMOS transistor elements, electrical interconnect traces and, in some implementations, one or more additional circuit elements such as diodes, capacitors, and the like. Each sensor pixel circuit 432 may be configured to convert an electric charge generated in the piezoelectric receiver layer 436 proximate to the pixel circuit into an electrical signal. Each sensor pixel circuit 432 may include a pixel input electrode 438 that electrically couples the piezoelectric receiver layer 436 to the sensor pixel circuit 432.

In the illustrated implementation, a receiver bias ($R_{bias}$) electrode 440 is disposed on a side of the piezoelectric receiver layer 436 proximal to the platen 406. The $R_{bias}$ electrode 440 may be a metallized electrode and may be grounded or biased to control which signals may be passed to the array of sensor pixel circuits 432. Ultrasonic energy that is reflected from the exposed (upper/top) surface 442 of the platen 406 may be converted into localized electrical charges by the piezoelectric receiver layer 436. These localized charges may be collected by the pixel input electrodes 438 and passed on to the underlying sensor pixel circuits 432. The charges may be amplified or buffered by the sensor pixel circuits 432 and provided to the processing unit. The processing unit may be electrically connected (directly or indirectly) with the first transmitter electrode 424 and the second transmitter electrode 426, as well as with the $R_{bias}$ electrode 440 and the sensor pixel circuits 432 on the substrate 434. In some implementations, the processing unit may operate substantially as described above. For example, the processing unit may be capable of processing the signals received from the sensor pixel circuits 432.

Some examples of suitable piezoelectric materials that can be used to form the piezoelectric transmitter layer 422 or the piezoelectric receiver layer 436 include piezoelectric polymers having appropriate acoustic properties, for example, an acoustic impedance between about 2.5 MRayls and 5 MRayls. Specific examples of piezoelectric materials that may be employed include ferroelectric polymers such as PVDF and PVDF-TrFE copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be utilized include polyvinylidene chloride (PVDC) homopolymers and copolymers, polytetrafluoroethylene (PTFE) homopolymers and copolymers, and diisopropylammonium bromide (DIPAB).

In some implementations, at least elements of ultrasonic receiver 410 may be fabricated with sensor pixel circuits 432 configured as thin-film transistor (TFT) circuitry or CMOS circuitry on or in the same substrate, which may be a silicon, SOI, glass or plastic substrate, in some examples. For example, a TFT substrate may include row and column addressing electronics, multiplexers, local amplification stages and control circuitry.

Figure 5:
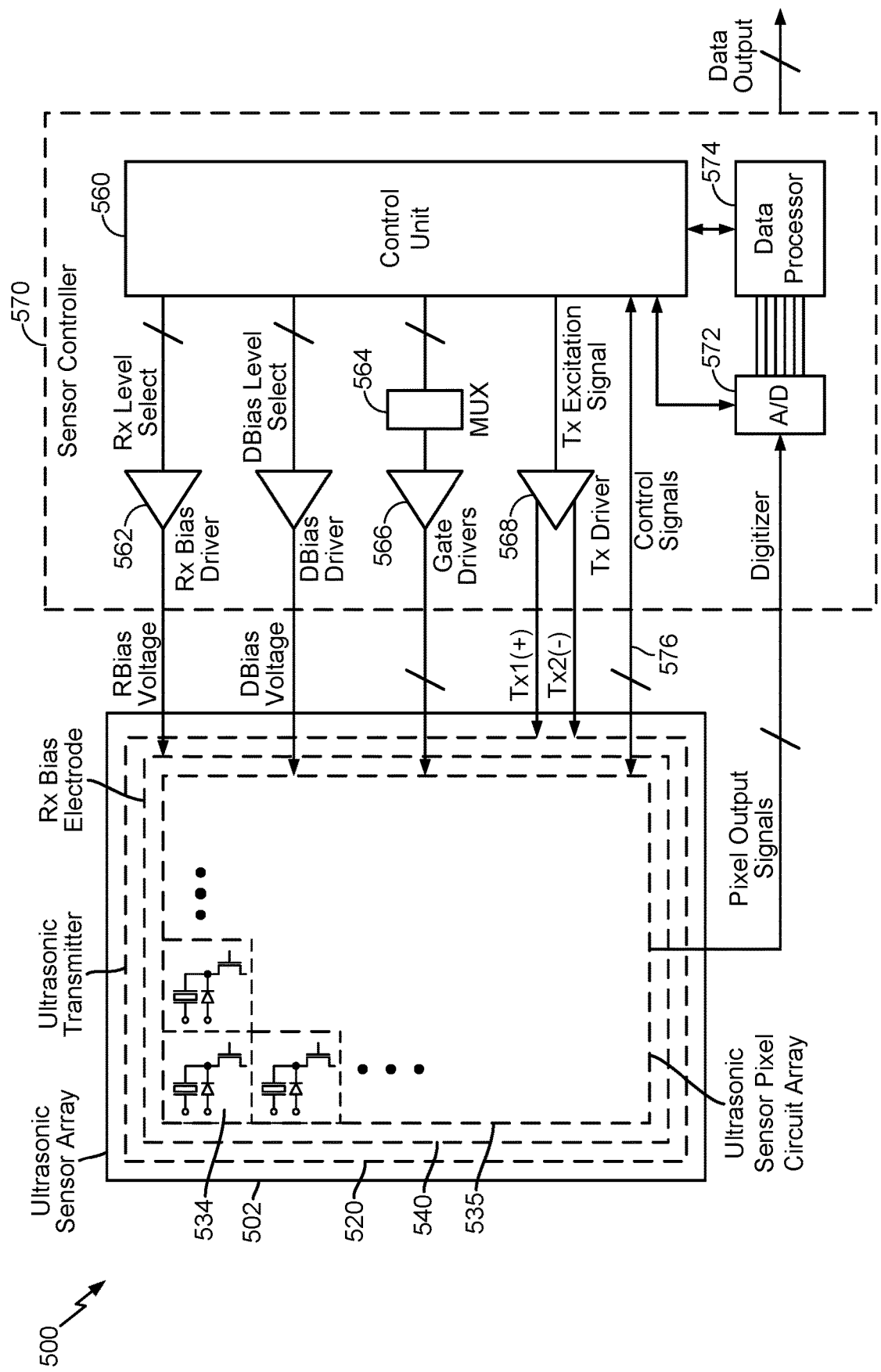
FIG. 5 illustrates a block diagram of an ultrasonic sensor system, according to an implementation.

FIG. 5 illustrates a block diagram of an ultrasonic sensor system, according to an implementation. The ultrasonic sensor system 500 may include an ultrasonic sensor array 502 that includes an ultrasonic transmitter 520, an ultrasonic sensor pixel circuit array 535 and an Rx bias electrode 540. The ultrasonic transmitter 520 may be electrically coupled with a transmitter driver ("Tx driver") 568. In some implementations, the Tx driver 568 may have a positive polarity output signal (Tx1(+)) and a negative polarity output signal (Tx2(−)) electrically coupled with one or more transmitter electrodes associated with the ultrasonic transmitter 520. The Tx driver 568 may be electrically coupled with a control unit 560 of a sensor controller 570. The control unit 560 may be configured to control various aspects of the sensor system 500, e.g., ultrasonic transmitter timing and excitation waveforms, receiver bias voltages, pixel addressing, signal filtering and conversion, readout frame rates, and so forth. The control unit 560 may provide one or more transmitter excitation signals to the Tx driver 568. The control unit 560 may be electrically coupled with a receiver (Rx) bias driver 562 through, for example, an Rx level select input bus. The Rx bias driver 562 may provide an RBias voltage to the Rx bias electrode 540. The control unit 560 may be electrically coupled with one or more demultiplexers 564. The demultiplexers 564 may be electrically coupled with a plurality of gate drivers 566. The gate drivers 566 may be electrically coupled with the sensor pixel circuit array 535 of the ultrasonic sensor array 502. The gate drivers 566 may be positioned external to the sensor pixel circuit array 535, in some implementations. In other implementations, the gate drivers 566 may be included on a common substrate with the sensor pixel circuit array 535. The demultiplexers 564, which may be external to or included on a common substrate with the sensor pixel circuit array 535, may be used to select specific gate drivers 566. The gate drivers 566 may select one or more rows or columns of the sensor pixel circuit array 535. The sensor pixel circuit array 535, which, in the illustrated implementation, includes a number of individual ultrasonic sensor pixels 534, may be electrically coupled with one or more digitizers 572. The digitizers 572 may convert analog pixel output signals from one or more of the individual sensor pixels 534 to digital signals suitable for further processing within a data processor 574. The data processor 574 may be included (as illustrated) in the sensor controller 570. In other implementations, the data processor 574 may be external to the sensor controller 570. In the illustrated implementation, the sensor controller 570 may include one or more data processors 574 that receive data from the sensor pixel circuit array 535. The sensor controller 570 may provide data outputs to an external system or processor, such as an applications processor of a mobile device. The data processor 574 may translate the digitized data into image data of a fingerprint or format the data for further processing.

Each ultrasonic sensor pixel 534 may include a PMUT element that may serve as an ultrasonic receiver and/or an ultrasonic transmitter. Each sensor pixel 534 may also include a sensor pixel circuit that is associated with the PMUT element. The associated PMUT element may overlay each sensor pixel circuit, that is, the associated PMUT element and the sensor pixel circuit may be included within a common footprint area. Advantageously, the sensor pixel circuit may be contained in a footprint area that is no larger than a footprint area of the PMUT element. In some implementations, the ultrasonic transmitter 520 may include a layer of piezoelectric material sandwiched between two transmitter electrodes and positioned above or below the ultrasonic sensor pixel circuit array 535.

The ultrasonic transmitter 520 may be electrically coupled to and driven by the transmitter excitation signals by way of the Tx driver 568 to generate and launch ultrasonic waves. In some implementations, the transmitter excitation signals may be coupled to one or more electrodes in each PMUT or PMUT array, such as a transmit electrode associated with each PMUT, to allow the generation and launching of ultrasonic waves. In some implementations, the PMUTs in the PMUT array may be provided with a transmitter excitation signal that may be applied in common to some or all of the transmit electrodes in the PMUT array to launch a substantially plane ultrasonic wave.

In some implementations, the control unit 560 may be configured to send a Tx excitation signal to a Tx driver 568 at regular intervals so as to cause the Tx driver 568 to excite the ultrasonic transmitter 520 and produce one or more ultrasonic waves. The control unit 560 may also be configured to send level select input signals through the Rx bias driver 562 to bias the Rx bias electrode 539 and allow gating for ultrasonic signal detection by the ultrasonic sensor pixels 534. One or more of the demultiplexers 564 may be used to turn on and off the gate drivers 566 that cause a particular row or column of the sensor pixel circuit array 535 to provide pixel output signals. Output signals from the sensor pixel circuit array 535 may be sent through a charge amplifier, a filter such as a resistor-capacitor (RC) filter or an anti-aliasing filter, and the digitizer 572 to the data processor 574. One or more control lines 576 may carry control signals between the sensor controller 570 and the ultrasonic sensor array 502.

Figure 6:
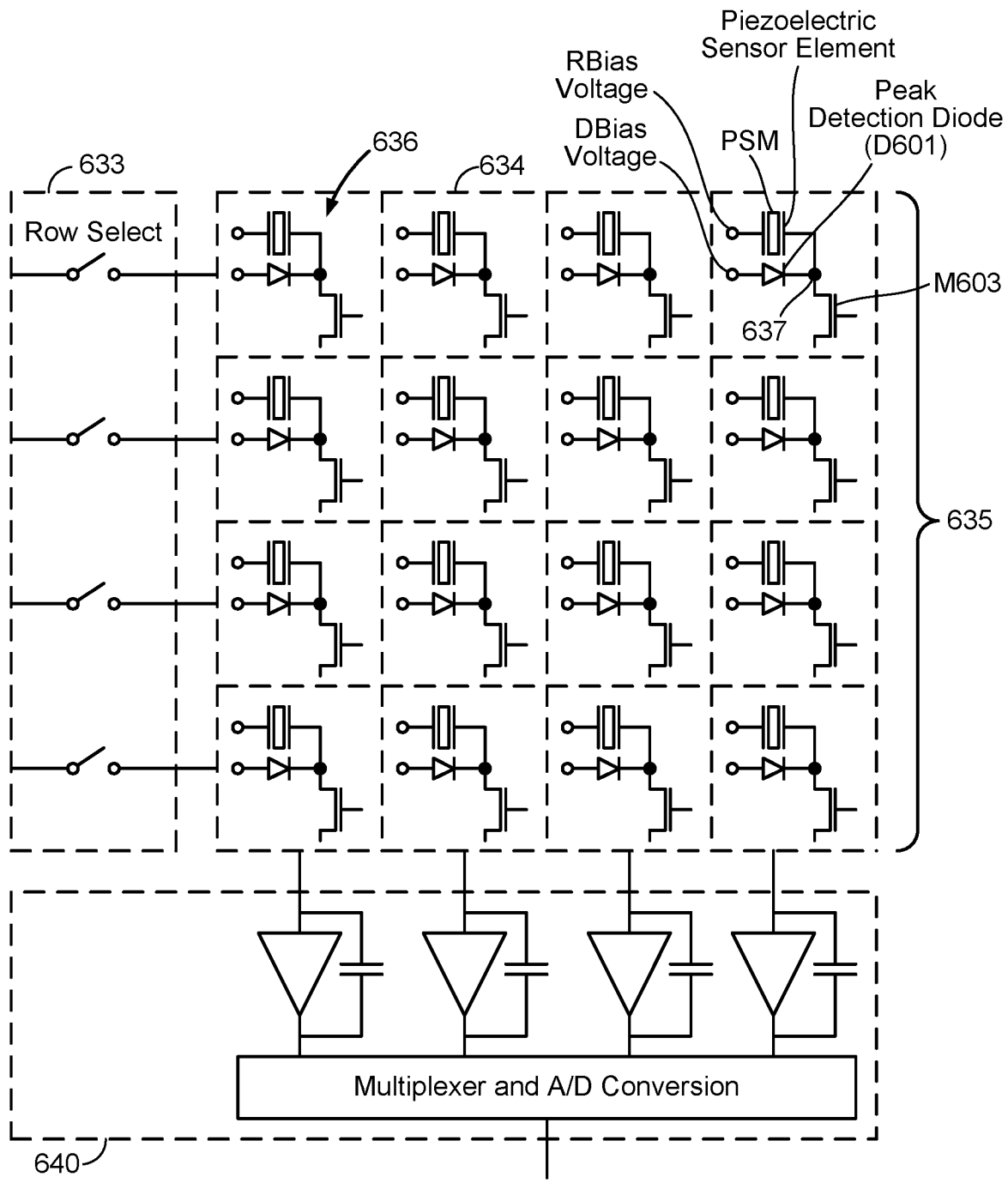
FIG. 6 illustrates a simplified block diagram of a sensor pixel array coupled with pixel readout electronics.

FIG. 6 illustrates a simplified block diagram of a sensor pixel array coupled with pixel readout electronics. In the illustrated implementation, an ultrasonic sensor pixel array 635 includes sixteen ultrasonic sensor pixels 634 arranged in a 4×4 array for an ultrasonic sensor. Each sensor pixel 634 may be associated with a local region of piezoelectric sensor material (PSM) and may include a sensor pixel circuit 636 that includes a peak detection diode D601 and a readout transistor M603. Many or all of these elements may be formed on or in a common substrate to form each sensor pixel circuit 636. In operation, the local region of PSM of each sensor pixel 634 may transduce received ultrasonic energy into electrical charges. The peak detection diode D601 may register the maximum amount of charge (the "peak charge") detected by the local region of PSM. Each row of the pixel circuit array 635 may then be scanned, e.g., through a row select mechanism 633, a gate driver, or a shift register. Each readout transistor M603 may be triggered to allow the magnitude of the peak charge for each sensor pixel 634 to be read by additional circuitry, e.g., a multiplexer and an A/D converter of pixel readout electronics 640. The sensor pixel circuit 636 may include one or more TFTs (not illustrated) to allow gating, addressing, and resetting of the sensor pixel 634. Each sensor pixel 634 may include a PMUT element that may serve as an ultrasonic receiver and/or an ultrasonic transmitter. Each PMUT element in a PMUT sensor array may be associated with a respective sensor pixel circuit 636 in the sensor pixel circuit array 635. Pixel input electrode 637 of the sensor pixel circuit 636 may be used to make electrical connection with one or more electrodes in an overlying PMUT element.

Each sensor pixel circuit 636 may provide information about a small portion of the object detected by an ultrasonic sensor system such as, for example, ultrasonic sensor system 500 described in connection with FIG. 5. While, for convenience of illustration, the example shown in FIG. 4 is of a simple 4×4 array, ultrasonic sensors having a resolution on the order of 500 pixels per inch or higher may be configured with an appropriately scaled structure. The detection area of the ultrasonic sensor system may be selected depending on the intended target object. For example, the detection area may range from about 5 millimeters (mm)×5 mm for a single finger to about 80 mm×80 mm for four fingers. Smaller and larger areas, including square, rectangular and non-rectangular geometries, may be used as appropriate, depending on characteristics of the target object.

In some implementations that particularly benefit from the presently disclosed techniques, a detection area may be 6,000 square millimeters or greater and include one to five million PMUTs, for example. Such large area ultrasonic sensors may be configured to image multiple fingers simultaneously and/or image palm prints, entire hands, or similarly sized artificial or natural objects. In the absence of the presently disclosed techniques, the TFT layer signal traces may be unable to accommodate simultaneous operation of such a large number of PMUTs. More particularly, receiver signal outputs, resulting from localized electrical charges generated by the piezoelectric receiver layer and collected by the pixel input electrodes, may be degraded when a very large number of PMUT receivers are operating simultaneously.

To mitigate the above-mentioned problem, in some implementations, a temporal phasing is employed so as to avoid simultaneously outputting an excessive number of receiver signals. For example, in some implementations, an ultrasonic pulse may be produced by starting and stopping the transmitters of PMUT array during a short interval of time (e.g. less than 1 microsecond). In such implementations, acoustic signals returned to the PMUT array (resulting from interaction with, for example, a target object) may be temporally phased so that PMUT receivers at different locations in the array receive the returned acoustic signals at different times. Alternatively or in addition, the ultrasonic pulses outputted by the PMUT transmitters may be temporally phased.

Figure 7:
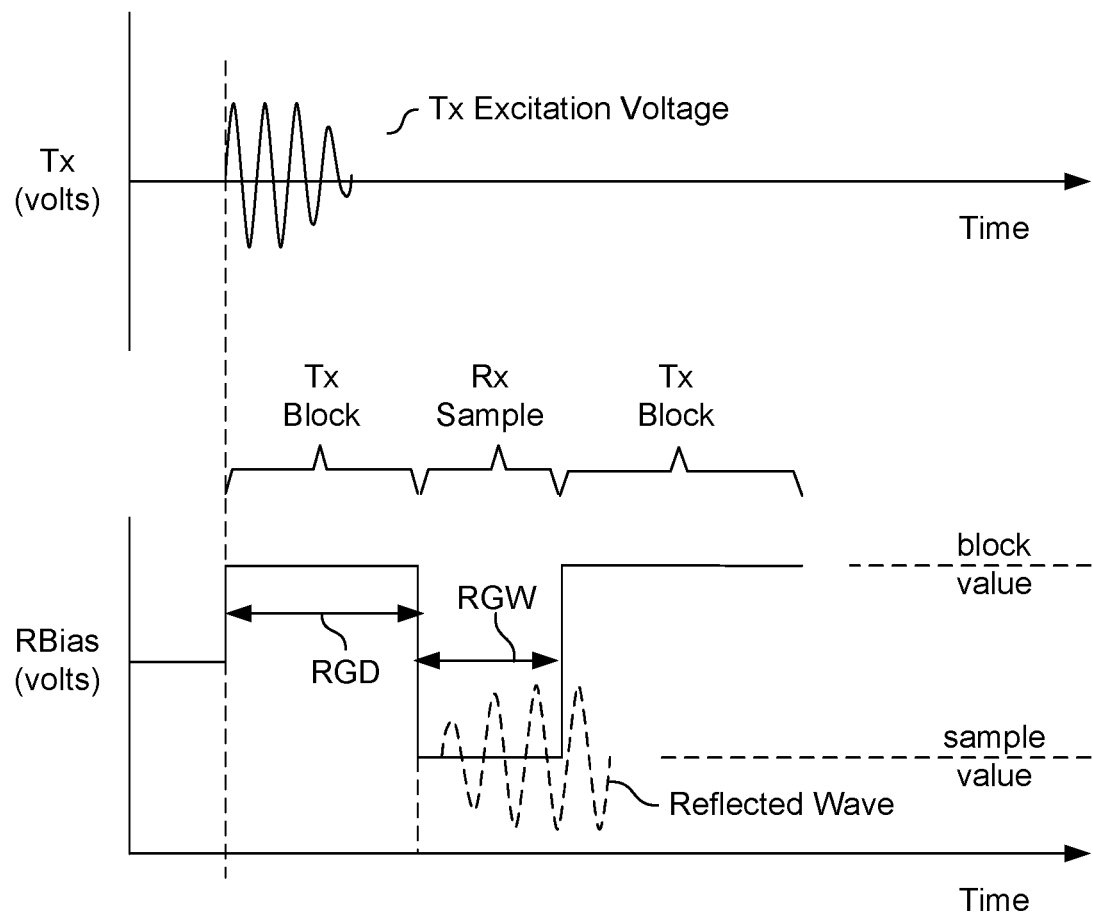
FIG. 7 graphically illustrates an example of transmitter excitation signals and receiver bias voltage levels as a function of time.

Features and benefits of the disclosed techniques may be better appreciated by referring to FIG. 7, which graphically illustrates an example of transmitter excitation signals and receiver bias voltage levels as a function of time. The transmitter excitation signals (upper graph) may be provided to an ultrasonic transmitter, whereas the receiver bias voltage (lower graph) may be applied to an RBias electrode of an ultrasonic sensor element. For example bias voltage levels may be applied to the RBias electrode 440 (FIG. 4) or 540 (FIG. 5) of an ultrasonic sensor array. One or more cycles of an ultrasonic transmitter excitation signal may be applied to the ultrasonic transmitter, as shown in the upper graph of FIG. 7. In some implementations, a single transmitter excitation cycle may be used. In some implementations, as illustrated, multiple excitation cycles may be used, such as two cycles, three cycles, four cycles, five cycles or more. The transmitter excitation signals in some implementations may be square waves, rectangular waves, partial waves, pulsed waves, multiple-frequency waves, chirped waves, low or high duty-cycle waves, variable-amplitude waves, variable-frequency waves, or other suitable waveform for driving an ultrasonic transmitter (e.g., ultrasonic transmitter 408 of FIG. 4, ultrasonic transmitter 520 of FIG. 5, and/or ultrasonic transmitter 820 of FIGS. 8A and 8B). During a first portion of time ("Tx Block") when transmission of the outgoing ultrasonic wave is occurring, the bias voltage applied to the RBias electrode may correspond to a "block value" such that the receiver bias electrode prevents signals reflected from outgoing transmitted waves from being captured by a sensor pixel circuit (e.g., sensor pixel circuit 636 of FIG. 6).

During a subsequent portion of time ("Rx Sample"), the bias level of the control signal applied to the RBias electrode is set to a "sample value" and the reflected ultrasonic signals may be captured a sensor pixel. The Rx Sample period may start upon completion of a range gate delay RGD period. The RGD period may typically be less than one microsecond. In some implementations, the RGD period may be about 500 nanoseconds. The duration of the Rx sample period may be referred to as the range gate window ("RGW") period. The RGW period may typically be less than one microsecond. In some implementations, the RGW period may be in the range of about 200 to 1,000 nanoseconds. To prevent detection of unwanted internal reflections, the bias level applied to the receiver bias electrode may be brought back to the block value upon completion of the RGW period. The RGW period, in the illustrated implementation, may correspond to a time interval that is roughly similar to the period of a transmitter excitation cycle. In other implementations, the RGW period may be shorter or longer than the period of the transmitter excitation cycle. During RGW period, the sensor pixel may be said to be in a "read mode" of operation. During or near the RGW period, the receiver may output signals, resulting from or corresponding to localized electrical charges generated by the piezoelectric receiver layer and collected by the pixel input electrodes.

In the absence of the presently disclosed techniques, each of a large number of pixels may output receiver signals simultaneously or nearly simultaneously with a result that at least some signals suffer degradation due to limitations of the TFT layer signal traces associated with pixel readout circuitry. To mitigate this problem, the present disclosure contemplates introducing small temporal delays between at least portions of reflected ultrasonic signals receiver in different portions of a receiver of an ultrasonic sensing system, resulting in time delays in the receiver signals outputted by the receiver. As a result, a load on the TFT layer signal traces may be significantly reduced.

Figure 8A:
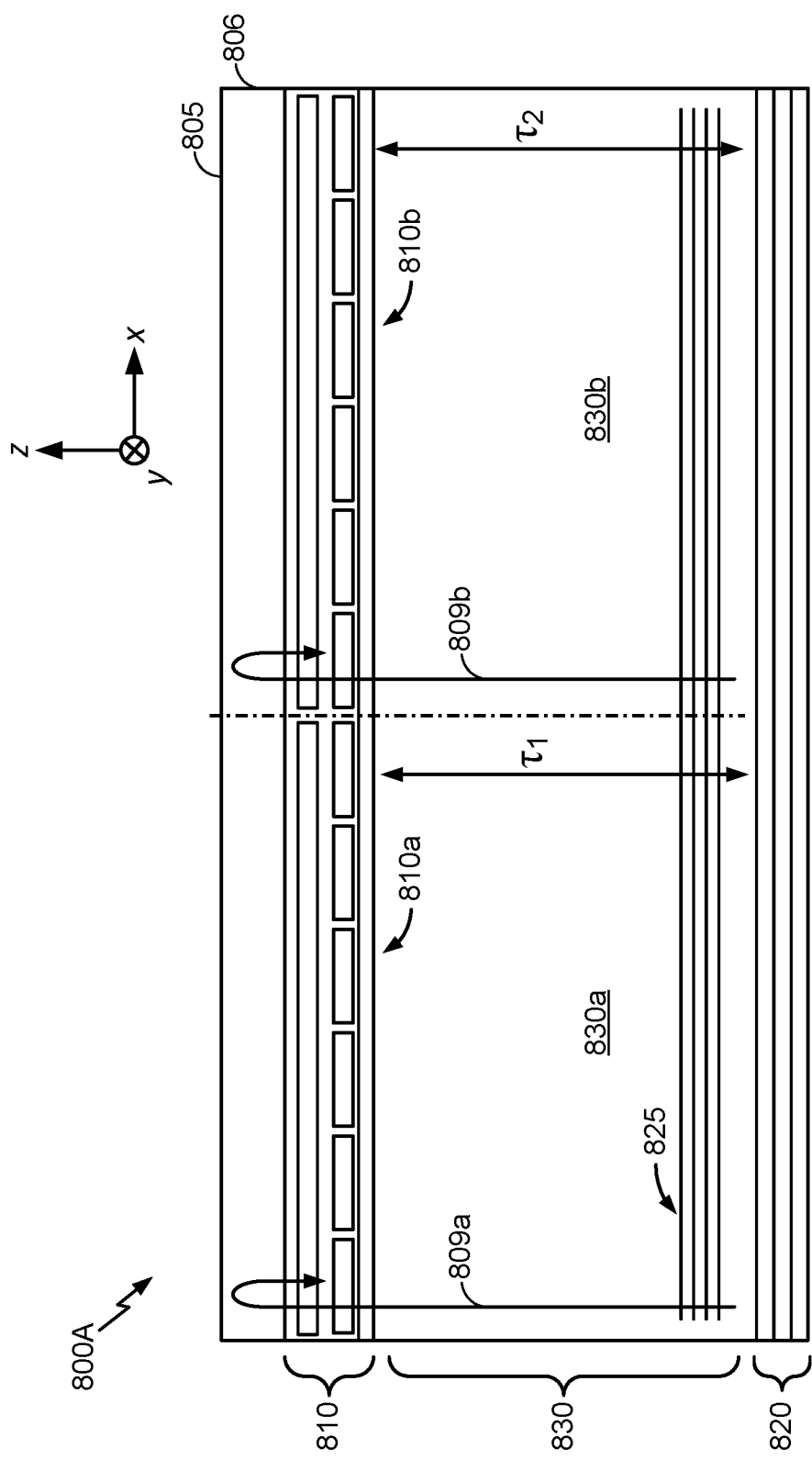
FIG. 8A illustrates an example of a stack of layers that can form part of an ultrasonic sensing system.
Figure 8B:
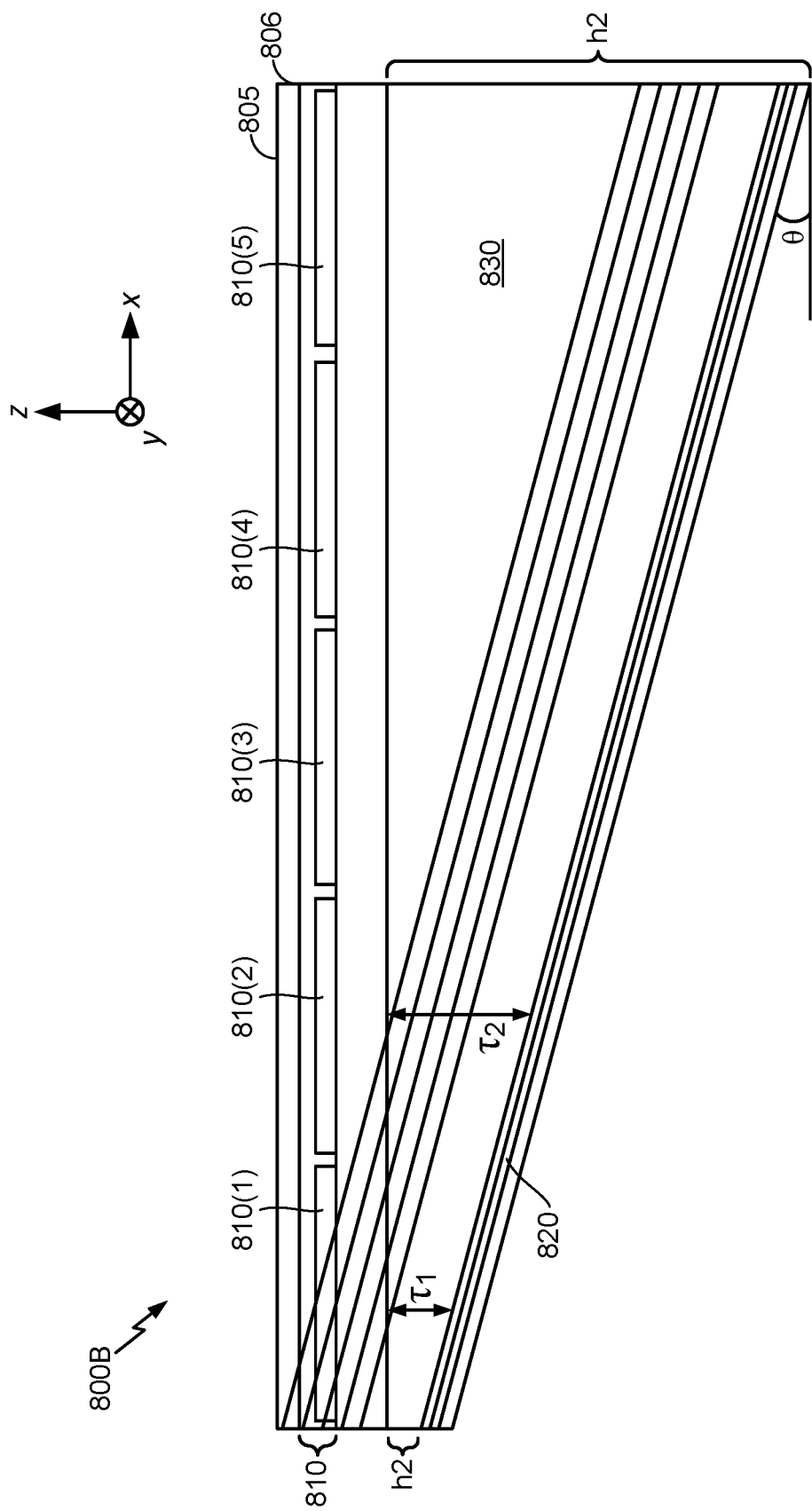
FIG. 8B illustrates an example of a stack of layers that can form part of an ultrasonic sensing system similar to the stack described above with reference to FIG. 8A.

FIG. 8A illustrates an example of a stack of layers that can form part of an ultrasonic sensing system, such as the ultrasonic sensing system 118 described with reference to FIG. 1 or the ultrasonic sensing system 200 shown and described with reference to FIGS. 2A and 2B. Compared to the stack of layers illustrated in FIGS. 3A, 3B, and 4, the stack of layers illustrated in FIG. 8A is capable of introducing different time delays (temporal phase) between reflected ultrasonic signals received in different portions of a receiver of the ultrasonic sensing system. In the illustration of FIG. 8A, the stack of layers 800A includes an array layer 820 of transmitters, which as described above with reference to ultrasonic transmitter 408 of FIG. 4, generally comprises multiple sublayers. For ease of reference, the array layer 820 of transmitters can simply be referred to as ultrasonic transmitter 820. The ultrasonic transmitter 820 can be configured to transmit an ultrasonic signal 825 towards a platen interface 805 of a platen 806. Although the array layer 820 is referred to as an "array" layer, it is understood that in some non-segmented transmitter implementations, the ultrasonic transmitter 820 need not be an array in the same sense as the receiver described below in that that transmitter 820 may not comprise a plurality of pixels. For example, in non-segmented transmitter implementations, generally speaking, the ultrasonic transmitter 820 comprises a first transmitter electrode layer, a piezoelectric transmitter layer, and a second transmitter electrode layer, all of which may be unpatterned blanket layers and therefore not an array. It is understood, however, that particularly large area ultrasonic sensors, such as sensors having an area greater than ten (10) or twenty (20)

square inches (an area greater than, for example, 65 or 130 square centimeter), may comprise a plurality of ultrasonic sensors similar to the embodiments described in FIGS. 8A and 8B, in which case the large area ultrasonic sensor may comprise a "segmented" transmitter. However, within each sensor unit making up the large area ultrasonic sensor, the transmitter can be a non-segmented transmitter and each of such sensor unit also comprising a corresponding acoustic delay gradient layer.

The stack of layers 800A further includes an array layer 810 of receivers, which as described above with reference to ultrasonic receiver 410 of FIG. 4, also generally comprises multiple sublayers. For ease of reference, the array layer 810 can simply be referred to as ultrasonic receiver 810. As described in FIG. 4, the ultrasonic receiver 810 comprises an array of pixels. The ultrasonic receiver 810 is configured to receive a reflection of the transmitted ultrasonic signal 825. The ultrasonic receiver is schematically illustrated as comprising multiple layers, including an array of pixel input electrodes and segmented bias electrodes, where each segmented bias electrode corresponds to each of receiver region 810a and 810b. However, as described elsewhere herein, the receiver bias electrode can be a blanket bias electrode as illustrated with reference to bias electrode 440 of FIG. 4.

Although not illustrated in the example of FIG. 4, additional layers may be disposed between ultrasonic receiver 410 and ultrasonic transmitter 408. Such layers may serve to mechanically strengthen the sensor 400. Additionally or alternatively, in situations where the processing of the electronic signals may be improved by providing for a desired time delay between the transmission of the ultrasonic signals by the ultrasonic transmitter 408 and the receipt of the ultrasonic receiver 410, particularly when platen 406 is not thick enough to introduce the desired time delay, an acoustic delay layer can be provided to increase the distance over which acoustic ultrasonic waves travel to provide for such a delay. Such a delay line may provide a uniform delay across the device, meaning reflected ultrasonic signals will generally be received at the receiver all at the same time. However, as described elsewhere herein, in some situations where an ultrasonic sensor is large, for example larger than 2-3 centimeters (cm) in one or more dimensions, receipt by the ultrasonic receiver of all reflected ultrasonic signals across the entire receiver array at the same time may cause issues when the ultrasonic receiver is converting the received ultrasonic signal to an outputted electrical signal. As such, it can be desirable to not only introduce a time delay between transmission and reception of the ultrasonic signal, but to introduce different time delays for different portions of the ultrasonic signal to be received by different portions or regions of the ultrasonic receiver.

As such, the stack of layers 800A of FIG. 8A further includes an acoustic delay gradient layer 830 disposed in an acoustic path, for example acoustic path 809a and/or acoustic path 809b, between the ultrasonic transmitter 820 and the ultrasonic receiver 810. As illustrated, the acoustic delay gradient layer 830 is disposed between the ultrasonic transmitter 820 and the ultrasonic receiver 810, or stated differently, the ultrasonic transmitter 820 and the ultrasonic receiver 810 are on opposite sides of the acoustic delay gradient layer. However, this need not necessarily be so. An alternate implementation can include a stack where the ultrasonic receiver and ultrasonic transmitter are both disposed on the same side of the acoustic delay gradient layer so long as the acoustic delay gradient layer is disposed in an acoustic path for ultrasonic signals propagating from the transmitter to the receiver. In one such example, the acoustic delay gradient layer 830 can serve as the illustrated platen 806 (and therefore layer 830 is removed), in which case, the acoustic delay gradient layer 830 remains disposed in an acoustic path between the ultrasonic transmitter 820 and the ultrasonic receiver 810. Alternatively, the platen 806 can be disposed on one side of the acoustic delay gradient layer 830 and the transmitter and receiver on another side of the acoustic delay gradient layer 830. As illustrated, acoustic paths 809a, 809b represents paths that an ultrasonic signal 825 travels from the time it is transmitted by the ultrasonic transmitter 820, reflects off of the platen interface 805, until the time it is received by the ultrasonic receiver 810. Hence, in various implementations, the acoustic path 809a, 809b can include a reflection off of the platen interface 805, and such a reflection can occur before the ultrasonic signal 825 propagates through the acoustic delay gradient layer 830, after the ultrasonic signal 825 propagates through the acoustic delay gradient layer 830, or both. As illustrated, the ultrasonic receiver 810 is closer to the platen interface 805 than the ultrasonic transmitter 820. In an alternative implementation, where, for example, the ultrasonic transmitter 820 is closer to the platen interface 805 than the ultrasonic receiver 810, acoustic paths 809a, 809b may be different paths from those illustrated, but would remain paths the ultrasonic signal 825 travels from its transmission by the ultrasonic transmitter 820 to its reception by the ultrasonic receiver 810. In one implementation, as discussed above with reference to FIGS. 3A and 3B, a single piezoelectric layer may serve as the ultrasonic transmitter 820 and the ultrasonic receiver 810, in which case the acoustic delay gradient layer 830 can be disposed in an acoustic path between the single layer transmitter/receiver and the platen 806.

Additionally or alternatively, although the acoustic delay gradient layer 830 is illustrated as a single layer, it is understood that the acoustic delay gradient layer 830 can include multiple layers, even non-adjacent layers (for example, the illustrated layer 830 along with the illustrated platen 806 layer), but remains an acoustic delay gradient layer so long as the, for example, multiple possibly non-adjacent layers together introduce an acoustic delay gradient in received ultrasonic signals across one or more dimensions of an ultrasonic receiver. Such an acoustic delay "gradient" need not be linear, but remains a gradient so long as a first acoustic time delay introduced in a first region or portion 830a of the ultrasonic receiver is different from a second acoustic time delay introduced in a second region or portion 830b of the ultrasonic receiver in one or more dimensions. The one or more layers contributing to the introduction of the different acoustic time delays across one or more dimensions, for example in a dimension along the illustrative x-axis, can therefore be referred to as an acoustic delay gradient layer. The acoustic delay gradient layer is referred to as an "acoustic" delay gradient layer because it introduces the different time delays to acoustic signals such as ultrasonic signals. As such, a means for introducing an acoustic delay gradient can comprise the acoustic delay gradient layer 830.

As illustrated, the ultrasonic receiver 810 comprises a plurality of receiver regions 810a, 810b including at least a first receiver region 810a and a second receiver region 810b. With reference to the receiver 410 illustrated in FIG. 4, the receiver can comprise a plurality of pixels arranged in a two-dimensional array, where each pixel is defined by each of input electrodes 438. As such, the first receiver region 810a and the second receiver region 810b may each comprise multiple rows of such receiver pixels, where each row extends along the y-axis and the number of such multiple rows define a width of the region 810a, 810b in along the x-axis. Although two receiver regions 810a and 810b are illustrated, it is understood that the plurality of receiver regions 810a, 810b can include any number of regions greater than one region. In various examples, the plurality of receiver regions 810a, 810b include five (such as the example illustrated in FIG. 8B), ten, or more regions. In one example, the receiver array can comprise an array of M×N array of 'M' rows and 'N' columns of receiver pixels, where M and N may both be between one thousand and two thousand. In one such example, there may be about ten different regions, where each region includes between one hundred and two hundred rows. While the remainder of the discussion with respect to FIGS. 8A, 8B, 8C, 8D, and 8E assumes that a region of the receiver spans the whole receiver array along the y-axis and only a portion of the receiver array along the x-axis, it is understood that a region could be made up of any contiguous, or even non-contiguous, grouping of receiver pixels.

Returning to FIG. 8A, the acoustic delay gradient layer 830 is configured to introduce a different time delay for acoustic signals traveling through it in a region 830a corresponding to the first receiver region 810a compared to a time delay for acoustic signals traveling through it in a region 830b corresponding to the second receiver region 810b. As such, the acoustic delay gradient layer 830 is configured to cause a reflection from the platen interface 805 of the transmitted ultrasonic signal 825 to reach the first receiver region at a first time and configured to cause a reflection from the platen interface 805 of the transmitted ultrasonic signal 825 to reach the second receiver region at a second time that is different from the first time. With brief reference here to FIG. 8C, in an implementation where receiver region 810a corresponds with portion 810(1) of FIG. 8B and receiver region 810b corresponds with portion 810(2) of FIG. 8B, the difference between the above referenced first time, $t_1$, and second time, $t_2$, can correspond with $\Delta t_1$ shown in FIG. 8C, where $\Delta t_1 = t_2 - t_1$.

The acoustic delay gradient layer 830 is configured to introduce a time delay gradient across at least one dimension of the device, such as, in the illustrated example, introducing a time delay gradient across the x-axis. Hence, an ultrasonic signal 825 transmitted at different locations along the x-axis of the ultrasonic transmitter 820 will have a different time delay introduced to it by the acoustic delay gradient layer 830. Where the dimensions of the ultrasonic transmitter 820 in the xy-plane are relatively large compared to the height of the stack of layers 800A along the z-axis, the ultrasonic signal 825 will be close to a plane wave or substantially a plane wave. As such, the acoustic path for different portions of the plane wave ultrasonic signal 825 will generally be along the z-axis, for example, largely perpendicular to the ultrasonic transmitter 820. Therefore, the acoustic delay gradient layer 830 is configured to introduce a different time delay for a portion of the ultrasonic signal 825 travelling along acoustic path 809a compared to a time delay introduced for a portion of the ultrasonic signal 825 travelling along acoustic path 809b. Such different time delays for different portions of the transmitted ultrasonic signal 825 depending on where along the illustrative x-axis the signal was transmitted can result from, for example, a difference in the length of acoustic path 809a compared to the length of acoustic path 809b. In one example, this could be introduced by, as illustrated further below in FIG. 8B, a tapered acoustic delay gradient layer 830. Additionally or alternatively, the acoustic delay gradient layer 830 can be a stepped layer, with a plurality of regions, each region having a different height. In the example illustrated in FIG. 8A with two regions 830a, 830b, the acoustic delay gradient layer 830 can have a physical thickness, $\tau_1$, in region 830a that is different from physical thickness, $\tau_2$, in region 830b. As such, the physical thicknesses $\tau_1$, $\tau_2$ contribute to different portions of the reflected transmitted ultrasonic signal to reach different regions of the receiver after propagating over different physical distances. For example, the different physical thicknesses contribute to the reflection of the transmitted ultrasonic signal reaching the first receiver region after propagating over a first physical distance and to the reflection of the transmitted ultrasonic signal reaching the second receiver region after propagating over a second physical distance different from the first physical distance. As such, one example of a means for causing the reflection from the platen interface to reach the first receiver region after propagating over a first physical distance and for causing the reflection from the platen interface to reach the second receiver region after propagating over a second physical distance different from the first physical distance can include an acoustic delay gradient layer 830 having different thicknesses in the different regions, such as a tapered and/or stepped acoustic delay gradient layer 830.

Although, as depicted, FIG. 8A shows both $\tau_1$ and $\tau_2$ as roughly equal, it is understood that FIG. 8A is intended to schematically show that different physical thicknesses, $\tau_1$, $\tau_2$, in different regions 830a and 830b are possible. In one such example, the acoustic delay gradient layer 830 can comprise a uniform material having the same speed of sound throughout the acoustic delay gradient layer 830 but where the physical thickness of the acoustic delay gradient layer 830 changes across the illustrative x-axis. In such an example, the length of acoustic path 809a and/or length of acoustic path 809b can be measured in physical distance, for example, in millimeters. Whether a tapered acoustic delay gradient layer 830 or a stepped acoustic delay gradient layer is used, for an example acoustic delay gradient layer 830 having a speed of sound for acoustic signals in the ~5,000 meters per second (m/s) range, a difference in acoustic path length of about 0.1 mm to 0.2 mm is sufficient to result in sufficient, for example ~20-40 nanosecond (ns), delay between two ultrasonic signals. In one example implementation with a stepped acoustic delay gradient layer 830, it may be helpful to further apply one or more planarization layers, such as one or more spin-on layers, to planarize the stepped acoustic delay gradient layer 830. In such an implementation, the stepped acoustic delay gradient layer 830 and the one or more planarization layers can together comprise the acoustic delay gradient layer 830.

Additionally or alternatively, the acoustic delay gradient layer 830 can introduce different time delays for portions of the ultrasonic signal 825 travelling along acoustic path 809a compared to acoustic path 809b by varying the speed of the ultrasonic signal 825 traveling along acoustic path 809a as compared to the speed of the ultrasonic signal 825 travelling along acoustic path 809b. In such an implementation, even if the physical thickness of the acoustic delay gradient layer 830 is uniform (for example, a non-tapered acoustic delay gradient layer), if measured in radians or in a number of wavelengths and/or fractions of wavelengths of the ultrasonic signal 825 traveling along acoustic paths 809a and 809b, the length of acoustic path 809a and acoustic path 809b can differ. This is because, even if the physical distance traveled by ultrasonic signal 825 is the same in two different regions, if the speed of the ultrasonic signal 825 is different in the two different regions, the length of first acoustic path 809a and the length of second acoustic path 809b will differ in terms of wavelength. For example, the acoustic delay gradient layer 830 can comprise the first acoustic delay gradient layer region 830a that is in a first acoustic path 809 of ultrasonic signal 825 to be reflected and received by the first receiver region 810a and the second acoustic delay gradient layer region 830b that is in a second acoustic path 809b of ultrasonic signal 825 to be reflected and received by the second receiver region 810b, where a first speed of sound propagating in the first acoustic delay gradient layer region 830a and a second speed of sound propagating in the second acoustic delay gradient layer region 830b are different. In one example, a first material in first acoustic delay gradient layer region 830a is different from a second material in the second acoustic delay gradient layer region 830b. The different materials may comprise, in one example, multiple strips of a desired thickness that are glued together when manufacturing the acoustic delay gradient layer, or may otherwise be formed such that the material composition of the acoustic delay gradient layer may have a linear or other profile that changes along the illustrative x-axis. In various implementations, the regions 830a, 830b may have different materials comprising different kinds of glass having different speed of sound properties and/or different kinds of plastic having different speed of sound properties. Hence, the acoustic delay gradient layer 830 can comprise a means for causing the ultrasonic signal to travel at the first speed of sound along the acoustic path 809a to the first receiver region 810a and a means for causing the ultrasonic signal to travel at the second speed of sound different from the first speed of sound along the acoustic path 809b to the second receiver region 810b.

In one implementation, one region comprises glass, while the other region comprises plastic. Additionally or alternatively, the base material of the acoustic delay gradient layer may be the same, for example a glass or plastic material, but the first acoustic delay gradient layer region 830a and the second acoustic delay gradient layer region 830b may be doped differently. In one such example, the acoustic delay gradient layer 830 comprises a glass layer, for example a borosilicate glass, and the glass layer in the first acoustic delay gradient layer region 830a has a doping that is different from a doping of the glass layer in the second acoustic delay gradient layer region 830b. Whether different materials are used or a single base material with different doping is used, speeds of sound within the acoustic delay gradient layer 830 can range from ~4,000 m/s to ~6,000 m/s. As such, for speeds in the range of ~5,000 m/s, and for an acoustic delay gradient layer 830 of ~5 mm, an introduction of a ~128 m/s speed of sound difference between two regions (where, for example, a first region has a speed of sound of about 5,000 m/s and a second region has a speed of sound of about 5,128 m/s) can result in a sufficient time delay, for example, about a 25 nanosecond delay, in the arrival of the reflected ultrasonic signal between the two receiver regions 810a, 810b. It is understood that these numbers are merely illustrative to provide an idea of the general order of magnitude of the speeds of sound in the materials that could be used as well as the thicknesses for example acoustic delay gradient layers. It is also understood that other materials exhibiting other acoustic speed properties are also usable, including plastics that can have acoustic speeds as low as ~2,000 m/s on the slow end of the spectrum to materials with very high acoustic speeds such as alumina, sapphire, and even diamond, where diamond can have an acoustic speed of about 12,000 m/s.

FIG. 8B illustrates an example of a stack of layers that can form part of an ultrasonic sensing system similar to the stack described above with reference to FIG. 8A. The stack of layers is capable of introducing different time delays (temporal phase) between reflected ultrasonic signals received in different portions of a receiver of the ultrasonic sensing system. FIG. 8B illustrates a conceptual cutaway view of a stack of layers 800B of an ultrasonic sensor system, according to an implementation. The stack of layers 800 includes an array layer 810 of receivers and an array layer 820 of transmitters. In order to introduce a delay between the time ultrasound waves are received at each of a plurality of receiver regions, for example receiver portions 810(1), 810(2), 810(3), 810(4), 810(5) (where, for example, the plurality of receiver regions include at least a first receiver region such as receiver portion 810(1) and a second receiver region such as receiver portion 810(2)), a physical characteristic of the stack of layers 800 is changed in the regions between transmitter array 820 and the portions 810(1), 810(2), 810(3), 810(4), 810(5), where the change in physical characteristic results in a propagation delay in the ultrasound signal before being received at each of portions 810(1), 810(2), 810(3), 810(4), 810(5). As noted above with reference to FIG. 8A, a tapered acoustic delay gradient layer 830 may be used to introduce different time delays for acoustic signals traveling through different regions of the acoustic delay gradient layer 830.

Figure 8C:
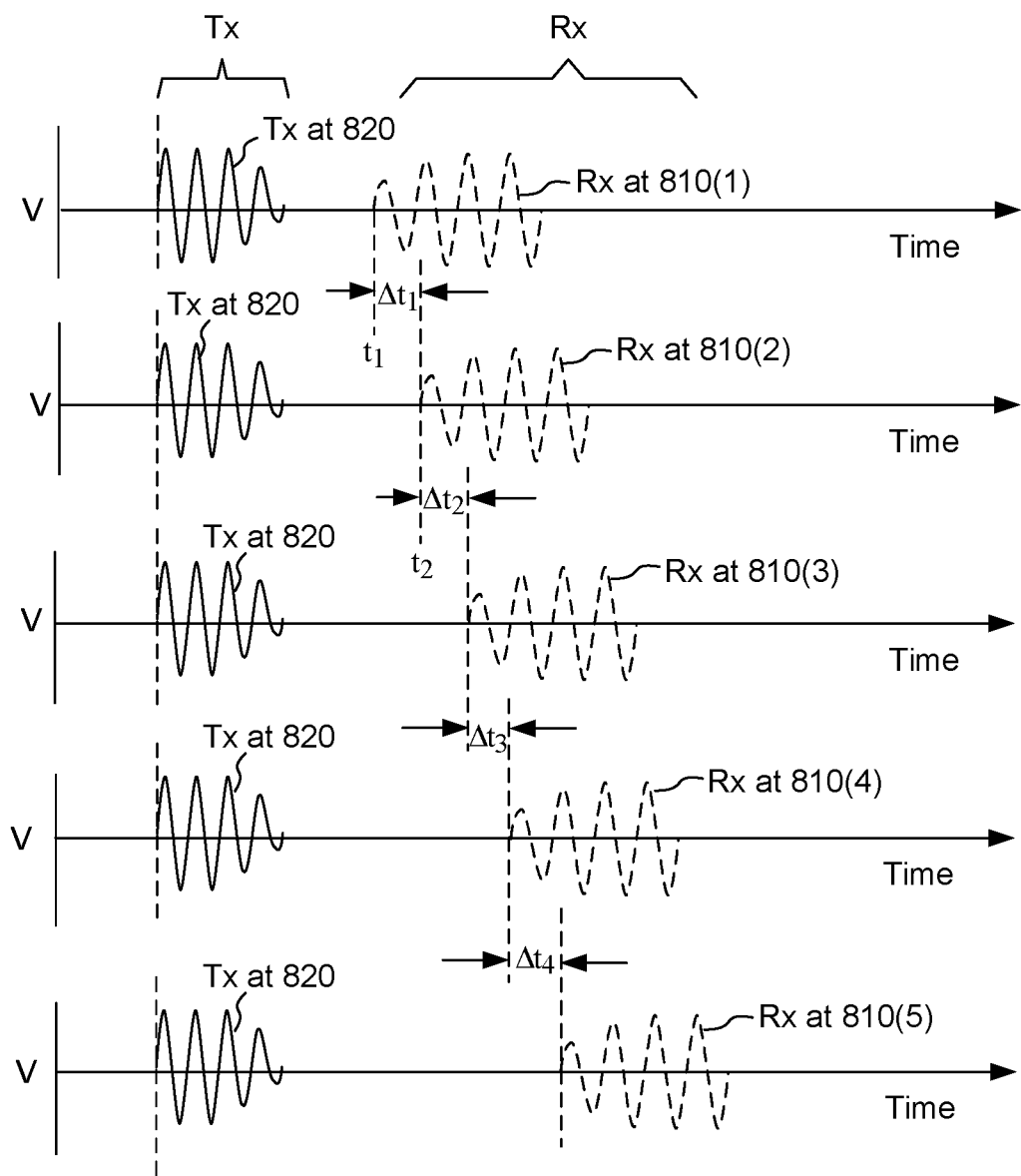
FIG. 8C illustrates an example of the timing of ultrasonic signals transmitted by an ultrasonic transmitter compared to the timing of the receipt of reflected ultrasonic signals at a plurality of receiver regions or portions for a stack of layers similar to that described with reference to FIGS. 8A and 8B.

In the illustrated implementation, the array layer 820 is not parallel with the array layer 810. As a result, the separation distance between receivers of array 810 and the array 820 is not uniform. In the illustrated implementation, the non-uniform separation is formed or maintained by the tapered acoustic delay gradient layer 830. Hence, in the illustrated implementation, the physical characteristic that is changed in each region between transmitter array 820 and each of receiver portions 810(1), 810(2), 810(3), 810(4), 810(5) is the physical distance between transmitter array 820 and each of receiver portions 810(1), 810(2), 810(3), 810(4), 810(5). The variation in physical distance results in a delay in the reception of the reflected ultrasound wave signal at each of receiver portions 810(1), 810(2), 810(3), 810(4), 810(5) after the signal has reflected off of the platen interface 805. More particularly, the separation between a first portion 810(1) of receivers in array 810 and the array 820 is smaller than the separation between a second portion 810(2) of receivers in array 810 and the array 820. Similarly: the separation between the second portion 810(2) of receivers and the array 820 is smaller than the separation between a third portion 810(3) of receivers and the array 820; the separation between the third portion 810(3) of receivers and the array 820 is smaller than the separation between a fourth portion 810(4) of receivers and the array 820; and the separation between the fourth portion 810(4) of receivers and the array 820 is smaller than the separation between a fifth portion 810(5) of receivers and the array 820. As a result, and as illustrated in FIG. 8C, acoustic signals, that may be launched simultaneously by the array 820 reach different receiver portions 810(i) of the array of receivers at different times. Each portion 810(i) may correspond to a number of pixel elements. For example, in some implementations, each portion 810(i) includes a number of rows of pixel elements. In the illustrated example, if the receiver input electrode array includes an M×N array of 'M' rows and 'N' columns, each portion 810(i) may include approximately M/5 rows. In other implementations, each portion 810(i) may include approximately M/10 or M/20 rows, for example.

In the example implementation illustrated in FIG. 8B, a wedge shaped delay line is obtained by a correspondingly wedge-shaped acoustic delay gradient layer 830 that defines a linearly varying distance between the receiver array layer 810 and the transmitter array layer 820. Hence, at the thin end of the acoustic delay gradient layer 830 along the x-axis, a physical thickness of the acoustic delay gradient layer 830 is $h_1$ and on the thick end of the acoustic delay gradient layer 830 along the x-axis, a physical thickness of the acoustic delay gradient layer 830 is $h_2$. Heights $h_1$ and $h_2$ can both be on the order of less than 10 mm, for example, ~5 mm such that $h_1$ is less than 4 mm and $h_2$ is about 5 mm. Hence, in the illustrated implementation of FIG. 8B, the acoustic delay gradient layer 830 comprises a tapered layer, a taper angle $\theta$ of the tapered layer causing the reflection from the platen interface 805 to reach the first receiver region 810(1) after propagating over a first physical distance and the tapered layer causing the reflection from the platen interface 805 to reach the second receiver region, 810(2), after propagating over a second physical distance different from the first physical distance. An average thickness of the acoustic delay gradient layer 830 along an acoustic path from the transmitter to the first receiver region 810(1), $\tau_1$, is different from an average thickness of the acoustic delay gradient layer 830 along another acoustic path from the transmitter 820 to the second receiver portion 810(2), $\tau_2$. In one implementation, the taper angle $\theta$ can be less than a ten degree angle, for example, less than a five degree angle, less than a two degree angle, or less than a one degree angle.

As noted above with reference to FIG. 8A, a difference between $\tau_1$ and $\tau_2$ of about 0.1 mm to 0.2 mm can introduce a sufficient time delay in the reflected ultrasonic signals received by the ultrasonic receiver in portions 810(1) and 810(2), thereby introducing a sufficient time delay in the electrical signals output by the receiver array 810. The acoustic delay gradient layer 830 may be composed of a glass or plastic for example. It will be appreciated that an acoustic layer may be configured in other shapes than the illustrated wedge-shaped configuration to provide non-uniform separation between an array of receivers and an array of transmitters. For example, a stair step arrangement, or a curvilinear configuration may be contemplated.

FIG. 8C illustrates an example of the timing of ultrasonic signals transmitted by an ultrasonic transmitter compared to the timing of the receipt of reflected ultrasonic signals at a plurality of receiver regions or portions for a stack of layers similar to that described with reference to FIGS. 8A and 8B. It may be observed that, as illustrated, a temporal delay is established in the reception of acoustic signals at adjacent portions of the array 810 such that the reception of acoustic signals at adjacent portions of the receiver array 810 are nonconcomitant. For example, the temporal delay between reception of acoustic signals at the first portion 810(1) and the second portion 810(2) is $\Delta t_1$, wherein, in one implementation, $\Delta t_1$ is long enough that there is little or no overlap between reception of acoustic signals at the first portion 810(1) and reception of acoustic signals at the second portion 810(2). Similarly, the temporal delay between reception of acoustic signals at the second portion 810(2) and the third portion 810(3) is $\Delta t_2$, wherein, in one implementation, $\Delta t_2$ is long enough that there is little or no overlap between reception of acoustic signals at the second portion 810(2) and reception of acoustic signals at the third portion 810(3), and so on. The temporal delays $\Delta t_1$, $\Delta t_2$, $\Delta t_3$, and $\Delta t_4$ may be in the range of a few tens to hundreds of nanoseconds. In an implementation, temporal delays may be 5-10% of transmitter excitation cycle duration, for example, or about 25-50 nanoseconds. In some implementations, $\Delta t_1$, $\Delta t_2$, $\Delta t_3$, and $\Delta t_4$ may be approximately equal, but this is not necessarily so. With reference to FIGS. 8A, 8B, and 8C, the frequency of the ultrasonic signal 825 output by the transmitter can range from about 7 MHz up to about 30 MHz. In one example, the frequency of the ultrasonic signal 825 is about 10-12 MHz.

Although the physical characteristic for introducing a delay in propagation time for the ultrasound signal that was varied in the illustrated embodiment of FIG. 8B was a physical distance between transmitter array 820 and portions 810(1), 810(2), 810(3), 810(4), 810(5), it is understood that the physical distance could remain constant (i.e., transmitter array 820 and receiver array 810 could be parallel), and another physical characteristic of one or more layers in the stack in each region between the transmitter array 820 and each of portions 810(1), 810(2), 810(3), 810(4), 810(5) could alternatively be changed in order to introduce the propagation delay. For example, the physical characteristic for introducing a delay in propagation time for the ultrasound signal can also include any physical characteristic capable of affecting the speed of the ultrasonic signal in the stack of layers between transmitter array and each of portions 810(1), 810(2), 810(3), 810(4), 810(5), including for example, the elasticity of one or more materials (such as by changing, for example, the bulk modulus or Young's modulus) in the stack, the density of one or more materials in the stack, and/or the number of interfaces in the stack. For example, glass can be doped to have different speeds of sound within it. Hence, the glass between the transmitter array 820 and each of portions 810(1), 810(2), 810(3), 810(4), 810(5) could be doped differently (or could otherwise comprise different materials each) such that even if transmitter array 820 and receiver array 810 are parallel, each of portions 810(1), 810(2), 810(3), 810(4), 810(5) would receive the ultrasound signal at a different time from the other portions. Additionally or alternatively, while the implementations of FIGS. 8A and 8B both illustrated an acoustic delay gradient layer disposed throughout the sensor system between the ultrasonic transmitter and the ultrasonic receiver, it is understood that in another implementation, one region may have no acoustic delay gradient layer at all, where ultrasonic signals will reflect and be received by the receiver very quickly relative to another region where there is an acoustic delay gradient layer as explained above. Hence, in one such implementation, a tapered acoustic delay gradient layer could taper down to a zero thickness for some portion of the sensor or a stepped acoustic delay gradient layer could have a first region with zero thickness, a first step with a first thickness, a second step with a second thickness greater than the first, and so on.

Figure 8D:
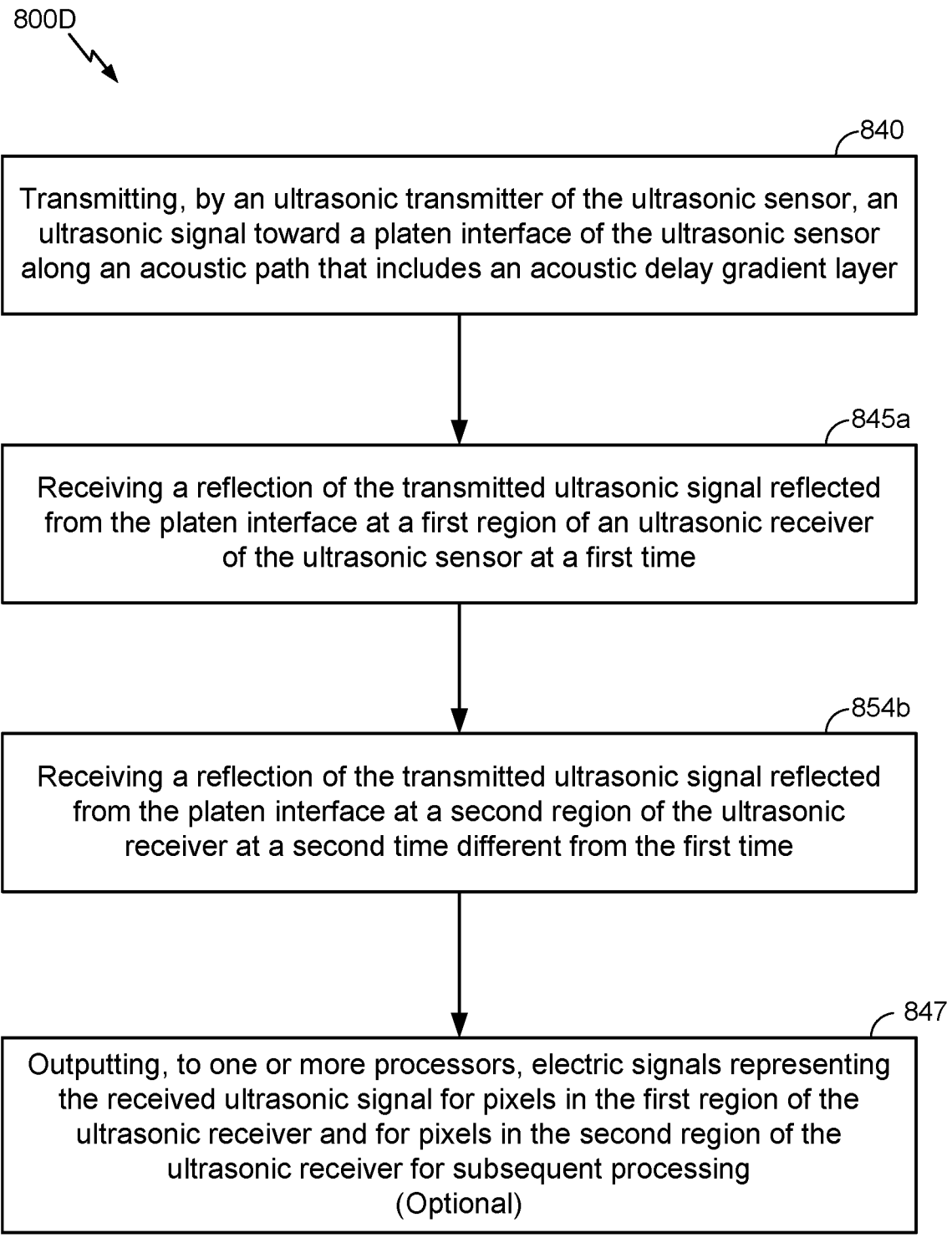
FIG. 8D illustrates an example method for operating an ultrasonic sensor.

FIG. 8D illustrates an example method 800D for operating an ultrasonic sensor. The method 800D begins at block 840 with transmitting, by an ultrasonic transmitter of the ultrasonic sensor, an ultrasonic signal toward a platen interface of the ultrasonic sensor along an acoustic path that includes an acoustic delay gradient layer. Hence, in some implementations, a controller (similar to control unit 560 with reference to FIG. 5) in communication with a memory storing instructions thereon can be configured to send a transmission excitation signal to a transmitter driver to excite the ultrasonic transmitter to produce and transmit the ultrasonic signal. In some implementations, the layers of the ultrasonic sensor are appropriately configured, such as the configurations of the examples of FIGS. 8A and 8B, so that the ultrasonic transmitter will transmit the ultrasonic signal towards the platen interface of the ultrasonic sensor along an acoustic path that includes the acoustic delay gradient layer. Hence, the ultrasonic sensor configuration can allow for the transmitter to transmit the ultrasonic signal through the acoustic delay gradient layer, for example acoustic delay gradient layer 830 (including first acoustic delay gradient layer region 830a and second acoustic delay gradient region 830b) with reference to FIG. 8A. Means for performing the functionality of block 840 can, but not necessarily, include, for example, control system 204 of FIG. 2A, controller 214 of FIG. 2B, memory 222 of FIG. 2B, ultrasonic transmitter 308 of FIGS. 3A and 3B, ultrasonic transmitter 408 of FIG. 4, ultrasonic transmitter 520 of FIG. 5, control unit 560 of FIG. 5, transmitter driver 568 of FIG. 5, and/or ultrasonic transmitter 820 of FIGS. 8A and 8B.

The method 800D continues at block 845a with receiving a reflection of the transmitted ultrasonic signal reflected from the platen interface at a first region of an ultrasonic receiver of the ultrasonic sensor at a first time. In one implementation, receiving the reflection of the transmitted ultrasonic signal reflected from the platen interface at a first region of the ultrasonic receiver at the first time can include a controller, such as control unit 560 with reference to FIG. 5, of the ultrasonic sensor controlling the application of a block voltage to a bias electrode corresponding to the first region of the ultrasonic receiver for a first RGD period, through, in one example, one or more receiver bias drivers such as receiver bias driver 562 with reference to FIG. 5. Means for performing the functionality of block 845a can, but not necessarily, include, for example, control system 204 of FIG. 2A, controller 214 of FIG. 2B, memory 222 of FIG. 2B, ultrasonic receiver 310 of FIGS. 3A and 3B, ultrasonic receiver 410 of FIG. 4, control unit 560 of FIG. 5, receiver bias driver 562 of FIG. 5, receiver bias electrode 540 of FIG. 5, receiver region 810a of FIG. 8A and/or portion 810(1) of FIG. 8B.

The method 800D continues at block 845b with receiving a reflection of the transmitted ultrasonic signal reflected from the platen interface at a second region of the ultrasonic receiver at a second time different from the first time. In one implementation, receiving the reflection of the transmitted ultrasonic signal reflected form the platen interface at the second region of the ultrasonic receiver at the second time can include a controller, such as control unit 560 with reference to FIG. 5, of the ultrasonic sensor controlling the application of a block voltage to a bias electrode corresponding to the second region of the ultrasonic receiver for a second RGD period, through, in one example, one or more receiver bias drivers such as receiver bias driver 562 with reference to FIG. 5. The difference, or temporal delay, between the first time and the second time can be in the range of a few tens to hundreds of nanoseconds, as described more fully with reference to FIG. 8C. Means for performing the functionality of block 845b can, but not necessarily, include, for example, control system 204 of FIG. 2A, controller 214 of FIG. 2B, memory 222 of FIG. 2B, ultrasonic receiver 310 of FIGS. 3A and 3B, ultrasonic receiver 410 of FIG. 4, control unit 560 of FIG. 5, receiver bias driver 562 of FIG. 5, receiver bias electrode 540 of FIG. 5, receiver region 810b of FIG. 8A and/or portion 810(2) of FIG. 8B. In some implementations, the difference in time between the first time and the second time is introduced by the propagation of the ultrasonic signal through the acoustic delay gradient layer. As such, the acoustic delay gradient layer can serve as a means for introducing a acoustic delay gradient to ultrasonic signals transmitted by the transmitter such that the first time is different from the second time. In some implementations, the ultrasonic receiver comprises a plurality of regions, including the first region and the second region of the receiver as well as additional regions, and the method comprises receiving a reflection of the transmitted ultrasonic signal at each region of the plurality of regions at a different time.

The description above with reference blocks 845a and 845b refer to the reception, by the first and second regions or portions of the receiver, of the ultrasonic signal after it has reflected from the platen interface, where the ultrasonic signal is received at two different times. As such, the receiving of the reflection of the transmitted ultrasonic signal of blocks 845a and 845b can include enabling the first receiver region to measure the reflection of the transmitted ultrasonic signal during a first window beginning at a first window begin time and to enable the second receiver region to measure the reflection of the transmitted ultrasonic signal during a second window beginning at a second window begin time different from the first window begin time. As such, controller in electrical communication with the ultrasonic receiver can be configured to enable the first receiver region to measure the reflection of the transmitted ultrasonic signal during a first window beginning at a first window begin time, for example $t_1$ with reference to FIGS. 8C and 10. The controller can also be configured to enable the second receiver region to measure the reflection of the transmitted ultrasonic signal during a second window beginning at a second window begin time, for example $t_2$ with reference to FIGS. 8C and 10. As can be seen from FIGS. 8C and 10, the second window begin time, $t_2$, is different from the first window begin time, $t_1$. Enabling the first and second regions to measure or sample the ultrasonic signal at different times can be achieved, in one example, by timing the application of the sample voltage to the receiver bias electrode(s). To sample the received ultrasonic signal and therefor generate an electrical signal representative of the ultrasonic signal, as described elsewhere herein, a bias level applied to the receiver bias electrode is changed from a block value to a sample value where, for the duration of the application of the sample value to the receiver bias electrode, the receiver samples the ultrasonic signal, for example by detecting a peak value during a RGW. Since the ultrasonic signal is received at the first region or portion at a different time from the second region or portion, it is advantageous to then apply the sample voltage to the receiver bias electrode at different times for the first region or portion compared to the second region or portion. The sample voltage to the bias electrode is applied during a RGW period and the timing of the RGW can be controlled in a manner described in greater detail with reference to FIGS. 11, 12, and 13. In one example, this can be accomplished using a segmented bias electrode (for example, with reference to the non-segmented bias electrode 440 of FIG. 4, if such an electrode were segmented, each segment could correspond to a region of the receiver). In one example, then, the controller can control the application of the sample voltage to the receiver bias electrode corresponding to a first receiver region during a first RGW beginning at a first window begin time and to control the application of a sample voltage to the receiver bias electrode corresponding to the second receiver region during a second RGW beginning at a second window begin time, where the first window begin time is different from the second window begin time. In one example, the second window begin time can begin after the first window begin time there being a first temporal delay between the first RGW and the second RGW as described with reference to FIG. 14. As described with reference to FIGS. 12 and 13, this may be achieved either by apply a RGD having a first duration for the first region or portion of the receiver and to apply a RGD having a second, different duration for the second region or portion of the receiver, or by applying RGDs of similar duration but where a first RGD period begins at a time different from the beginning of a second RGD period. Additionally or alternatively, as illustrated with reference to FIG. 11, a RGD for a second region of the receiver can be longer than the RGD for the first region of the receiver, an RGD for a third region of the receiver can be longer than the RGD for the second region of the receiver, and so on. As different regions or portions of the receiver are biased to block and to sample the reflected ultrasonic wave at different times using RGDs of different durations, the range gate may be referred to as a sliding range gate, as described elsewhere. However, in other implementations, such as the blanket bias electrode 440 illustrated with reference to FIG. 4, where the receiver bias electrode is not segmented, control of different regions of the receiver can be achieved in other ways. For example, the blanket bias electrode could be held at the sample voltage, and only select rows corresponding to a particular receiver region may be enabled at a time to accumulate charge based on the received reflected ultrasonic signal by manipulating other signals, for example, by manipulating, with reference to FIG. 6, the DBias Voltage on diode D601, or by otherwise timing the measurement of the magnitude of the ultrasonic signal by the receiver pixels within each of the first and second receiver regions using pixel circuitry, such as pixel circuitry 432 with reference to FIG. 4.

The method 800D optionally continues at block 847 with outputting electric signals representing the received ultrasonic signal for pixels in the first region or portion of the ultrasonic receiver and for pixels in the second region or portion of the ultrasonic receiver for subsequent processing to one or more processors, such as data processor 574 with reference to FIG. 5. In some implementations, although the times of receipt of the ultrasonic signal at the first and second receiver portions/regions differ, within each readout cycle, the electrical readout of pixel values for pixels is independent of the time of receipt of the ultrasonic signal and may occur in an order and manner that is independent of the time of receipt of the ultrasonic signal at the receiver. The subsequent processing may be performed wholly or partially at any of data processor 574 with reference to FIG. 5, and/or processor 220 with reference to FIG. 2B. Means for performing the functionality of block 847 can, but not necessarily, include, for example, control system 204 of FIG. 2A, controller 214 of FIG. 2B, memory 222 of FIG. 2B, ultrasonic receiver 310 of FIGS. 3A and 3B, ultrasonic receiver 410 of FIG. 4, control unit 560 of FIG. 5, control lines 576 of FIG. 5, digitizer 572 of FIG. 5, data processor 574 of FIG. 5, ultrasonic sensor pixel array 635 of FIG. 6, peak detection diode D601 of FIG. 6, readout transistor M603 of FIG. 6, row select 633 of FIG. 6, A/D converter of pixel readout electronics 640 of FIG. 6, receiver 810 of FIG. 8A and/or receiver 810 of FIG. 8B.

Figure 8E:
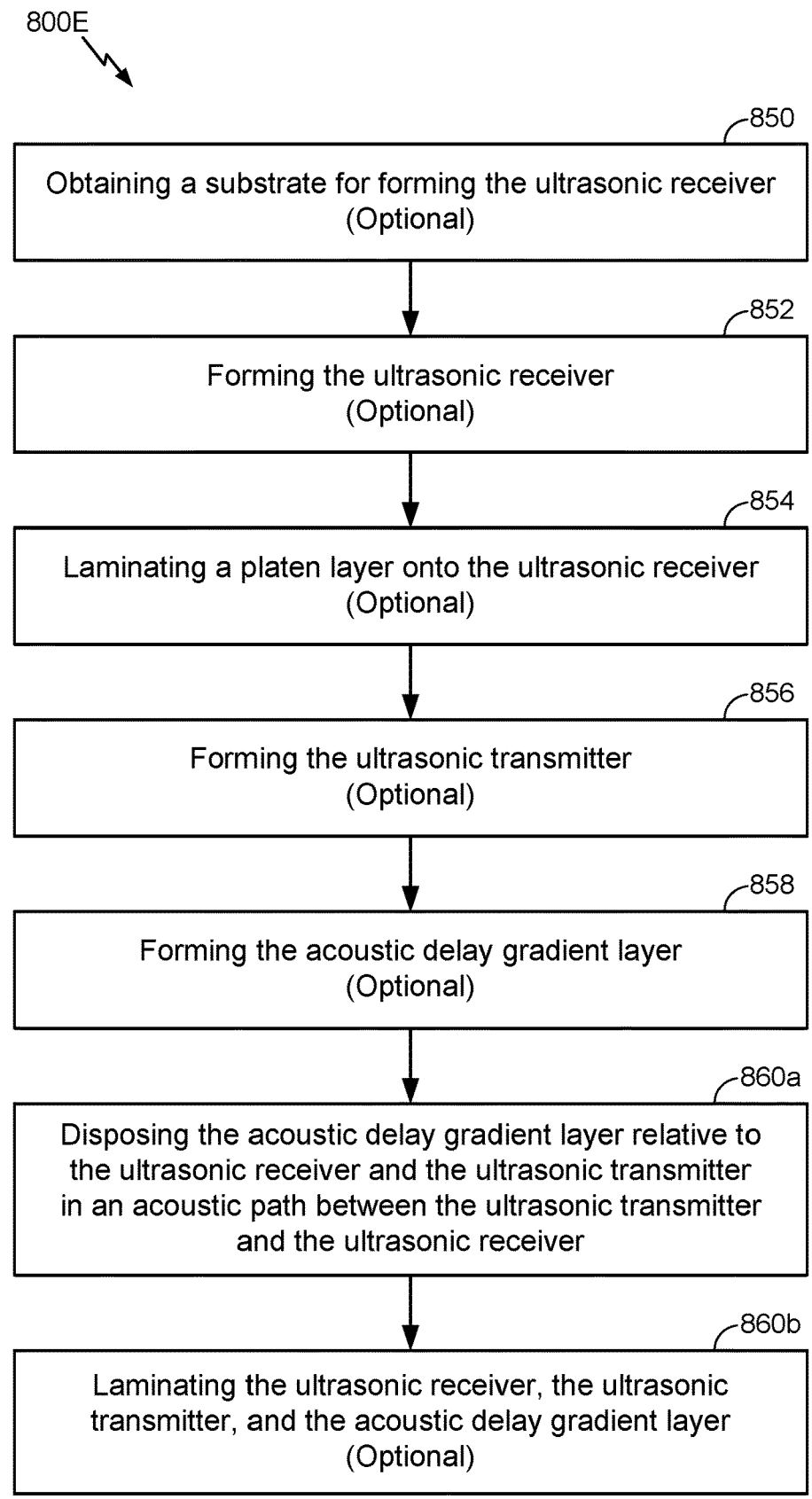
FIG. 8E illustrates an example method of manufacturing an ultrasonic sensor system.

FIG. 8E illustrates an example method 800E of manufacturing an ultrasonic sensor system. The method optionally begins at block 850 with obtaining a substrate for forming the ultrasonic receiver. In one implementation, such a substrate can include a substrate similar to substrate 434 of FIG. 4 and can include transistor circuits already formed using a previous process. In one example, the substrate can include a borosilicate glass. In a particular example, the borosilicate glass can have TFT circuits formed thereon.

The method optionally continues at block 852 with forming an ultrasonic receiver. In one implementation, the ultrasonic receiver can be formed on a first side of the substrate for forming the ultrasonic receiver. An array of receiver input electrodes, similar to those described above as pixel input electrodes 438 with reference to FIG. 4, can be patterned on the first side of the substrate, for example by screen printing, rotogravure printing, or by other means, using a conductive, for example, silver, ink. A piezoelectric layer, such as piezoelectric layer 436 with reference to FIG. 4, can then be formed over the patterned input electrodes. Although many piezoelectric materials are possible, example materials include plastics such as PVDF and/or copolymers of PVDF, as well as other potential piezoelectric materials, for example, as described elsewhere herein with reference to piezoelectric transmitter layer 422 or the piezoelectric receiver layer 436 of FIG. 4. In various implementations, the piezoelectric layer can be formed directly on the patterned receiver input electrodes on the substrate or may alternatively be formed and/or molded separately and laminated onto the patterned receiver input electrodes in a process similar to that described below with reference to block 856. The patterned array of receiver input electrodes can be configured to couple the piezoelectric receiver layer to the sensor pixel circuit formed on the substrate on which the receiver is being formed. Forming the ultrasonic receiver can include forming a bias electrode, similar to receiver bias electrode 440 with reference to FIG. 4, over the piezoelectric layer by some means such as printing a conductive ink. In one example, the receiver bias electrode can be an unpatterned layer covering the entire receiver. The biase electrode can then be attached to a conductive lead to allow to connection to electronics just as the substrate having preformed circuits upon which the receiver is formed and/or laminated can come with preformed leads to also allow connection to receiver electronics.

The method 800E optionally continues at block 854 with laminating a platen layer onto ultrasonic receiver. In one implementation, the platen may be laminated onto the bias electrode, with or without a passivation layer formed onto the bias electrode prior to lamination. In some implementations, with reference to FIGS. 8A and 8B, the platen interface includes a surface of the platen layer on which a finger of a user may touch which said touch may then be either registered for a touch screen application and/or a fingerprint image taken for an identification application. In some implementations, the platen layer may simply be a thin passivation layer formed over the receiver bias electrode, in which case the platen interface can be a surface of the thin passivation layer. In other implementations, there may be no platen at all, in which case, the surface of the bare receiver bias electrode can serve as the platen interface. In other implementations where a platen is desired, such a platen can be laminated onto the receiver bias electrode in optional block 854 using such materials as described above with reference to platen 306 of FIG. 3.

The method 800E optionally continues at block 856 with forming the ultrasonic transmitter. Although the ultrasonic transmitter can be formed in a manner similar to the receiver described above, where the receiver is formed over a substrate, drive electronics for the transmitter can be connected to the transmitter electrodes using conductive leads, and hence the transmitter can instead be formed without a substrate. As such, forming the ultrasonic transmitter can include forming a piezoelectric transmitter layer first by printing, as described above for the receiver bias electrode, transmitter electrodes on both sides of a preformed, for example, PVDF layer. Conductive leads can be formed for each of the electrodes to allow for connection to drive electronics.

With reference to blocks 852 and 856, it is understood that the piezoelectric layers formed may need to be treated to give those layers their piezoelectric properties. Using PVDF as an example, piezoelectric properties can be imparted upon the material by, in one example, mechanically stretching it to orient the molecular chains and poling the PVDF material under tension. Hence, in implementations where piezoelectric layer is preformed and laminated to form either the receiver or the transmitter, the preformed piezoelectric layer may already be rendered piezoelectric by such a process as a part of its preformation. However, in implementations where the piezoelectric layer is deposited, dispensed, and/or cured onto a substrate, forming the piezoelectric layer may also include such a stretching and poling procedure, or other procedure, to impart piezoelectric properties to the piezoelectric layer.

The method 800E optionally continues at block 858 with forming an acoustic delay gradient layer. In one implementation, forming the acoustic delay gradient layer can include forming the layer by, for example, dispensing and curing the acoustic delay gradient layer on, for example, a substrate such as the substrate on which the ultrasonic receiver and/or the ultrasonic transmitter is formed. In one particular such implementation, the acoustic delay gradient layer can be formed on a second side of the substrate on which the receiver was formed, where the receiver is formed on the first side of the substrate and the acoustic delay gradient layer is formed on a second side. As noted above, the acoustic delay gradient layer can include, in one implementation, a tapered layer. Such a layer can be dispensed onto the substrate, formed into a taper, and, for example, cured to form the acoustic delay gradient layer. It may also be possible to, using a photolithographic gradient or similar technique, to deposit, or etch an already deposited layer, in order to form a taper onto the substrate. In an embodiment with a stepped acoustic delay gradient layer, different materials can be dispensed, deposited, printed, or otherwise formed in patterns so as to form a stepped cross sectional, for example in the xz-plane cross sectional profile illustrated in FIG. 8A, profile. In another stepped acoustic delay gradient layer embodiment, a flat layer can be ground down and polished differently in different regions to form a stepped cross-sectional profile. In implementations where a planar acoustic delay gradient layer is desired, the tapered and/or stepped acoustic delay gradient layer may be planarized by, for example, one or more spin-on planarization layers. Other ways of forming the acoustic delay gradient layer onto the substrate already having some of the ultrasonic sensor formed thereon are also possible. For example, while the discussion above has related to an implementation where the acoustic delay gradient layer is formed onto a substrate having the receiver formed thereon, it is understood that alternatively, the acoustic delay gradient layer may also be formed onto, for example, an already formed transmitter. In such a case, the transmitter and acoustic delay gradient layer stack can then be laminated onto the receiver as described further below.

In an alternative implementation, the acoustic delay gradient layer can be formed separately, and laminated onto, for example, the second side of the substrate where the first side of said substrate has the receiver layers formed thereon (as described above with reference to block 852). For examples where different regions of the acoustic delay gradient layer are formed of different materials, a composite material acoustic delay gradient can be formed by laminating all these different materials together. In one example, with reference to the axes illustrated in FIGS. 8A and 8B, a plurality of strips extending along the y-axis with a given width each to define a region along the x-axis can be placed laterally next to each other and pressed together with epoxy to form an acoustic delay gradient layer that can, in an implementation, remain flat where the speed of sound of the material of each of the strips is different. Each of these strips could be of a similar material, for example, glass or plastic, but different kinds of glasses or plastics having different speeds of sound. Alternatively, some of the strips may be made of fairly disparate materials, where some strips are glass or sapphire, for example, and others are plastic. Such a composite material acoustic delay gradient layer can then be laminated onto to other layers of the sensor as described elsewhere herein. Alternatively, a flat, for example, glass plate could be doped different in several discrete region and/or a doping gradient could be applied across the flat glass plate in one or more dimensions, and said flat glass plate may then be laminated onto the second side of the receiver substrate. Flat, but doped or otherwise variably compositioned so as to have different speeds of sound in different regions, plastic layers may also be likewise laminated.

In implementations where the acoustic delay gradient layer is tapered, a flat, for example, glass, plate can be ground down and polished to form the tapered layer. A very smooth surface improves the acoustic properties of the layer. The tapered layer could then be laminated onto the receiver substrate, for example, on the second side opposite the side on which the receiver is formed. In a stepped layer implementation, the flat plate could be ground instead to form a stepped cross-sectional profile, and subsequently polished. Alternatively, the acoustic delay gradient layer could be formed of a plastic and molded into a tapered shape using compression, injection, or other molding technique and also then subsequently laminated onto the second side of the receiver substrate. Such molding techniques with plastic may also be used to generate a molded plastic stepped acoustic delay gradient layer.

In one particular example, such as when the substrate on which the receiver is formed and/or platen comprises a glass, for example a borosilicate glass, the acoustic delay gradient can also comprise a similar or same material. Such a choice can improve mechanical performance where, for example, the coefficients of thermal expansion of the receiver substrate is similar to or the same as the acoustic delay gradient layer.

The method 800E continues at block 860a with disposing the acoustic delay gradient layer relative to the ultrasonic receiver and the ultrasonic transmitter in an acoustic path between the ultrasonic transmitter and the ultrasonic receiver. It will be noted that blocks 850, 852, 854, 856, and 858 were all noted as optional in view of various implementations that allow for the receiver stack, the transmitter stack, and the acoustic delay gradient layer to each be separately formed. As such, in one implementation, a manufacturer may obtain a prefabricated receiver stack, a prefabricated transmitter stack, and a prefabricated acoustic delay gradient layer using some of the implementations described above and to assemble them into the layer stack for integration with other components of the ultrasonic sensor system. In such implementations, block 860a can include arranging the stack of the ultrasonic receiver, the ultrasonic transmitter, and the acoustic delay gradient layer such that the acoustic delay gradient layer is disposed in an acoustic path of an ultrasonic signal propagating from the ultrasonic transmitter, reflecting off of a platen interface, and then received at the receiver. In such implementations, block 860a can include disposing an appropriate adhesive and/or epoxy between each of the layers for subsequent lamination.

In such implementations where the ultrasonic receiver, the ultrasonic transmitter, and the acoustic delay gradient layer are formed separately and then appropriately arranged to properly dispose the acoustic delay gradient layer relative to the other layers, the method 800E can continue to block 860b with laminating the ultrasonic receiver, the ultrasonic transmitter, and the acoustic delay gradient layer to form a stack of layers. In one particular such implementation, the acoustic delay gradient layer may be disposed between the ultrasonic receiver and the ultrasonic transceiver and laminated together to form a stack of layers making up the ultrasonic sensor. In implementations where the acoustic delay gradient layer is a tapered layer, pressing the layers together to laminate can include introducing a counter wedge with support fingers along a periphery of the layers to prevent the tapered layer from being displaced during the pressing procedure.

Returning to block 860a, in other implementations, the acoustic delay gradient layer may be formed by dispensing, depositing, and/or curing the layer onto either the ultrasonic receiver or the ultrasonic transmitter, as described above. In such an implementation, block 860a can include some aspects of block 858, as forming the acoustic delay gradient layer onto an appropriate side of either the receiver or transmitter is one aspect of disposing the acoustic delay gradient layer in an acoustic path between the transmitter and the receiver. After forming the acoustic delay gradient layer onto either the ultrasonic receiver or the ultrasonic transmitter to form a delay layer plus receiver stack or a delay layer plus transmitter stack, the method can proceed to block 860b with laminating either the delay layer plus transmitter stack or the delay layer plus receiver stack onto the remaining component (either the ultrasonic transmitter or receiver). Hence, in one implementation of block 860b, not all layers need be formed separately for final lamination. Laminating the ultrasonic receiver, the ultrasonic transmitter, and the acoustic delay gradient layer together can be understood to encompass an implementation where two of the three layers are formed without lamination and those two layers are then together laminated onto the third layer.

In the above examples illustrated in FIGS. 8A, 8B, 8C, 8D, and 8E, the transmitter is a non-segmented transmitter configured to transmit the ultrasonic signal towards the platen interface 805 across an entirety of the non-segmented transmitter simultaneously. Hence the different kinds of variations in the acoustic delay gradient layer discussed above cause the time delays in the reflected ultrasonic signals received at the receiver thereby resulting in time delays in the electric signals output by the receiver. Alternatively or in addition to providing an acoustic delay gradient layer between an array of receivers and an array of transmitters, the array of transmitters may be segmented, and a temporal delay provided between transmission of acoustic signals from adjacent segments. Hence, for example, the transmitter may be segmented such that a first signal is transmitted or launched by a first segment of the transmitter, and sometime later, a second signal is transmitted or launched by a second segment of the transmitter, etc.

Figure 9:
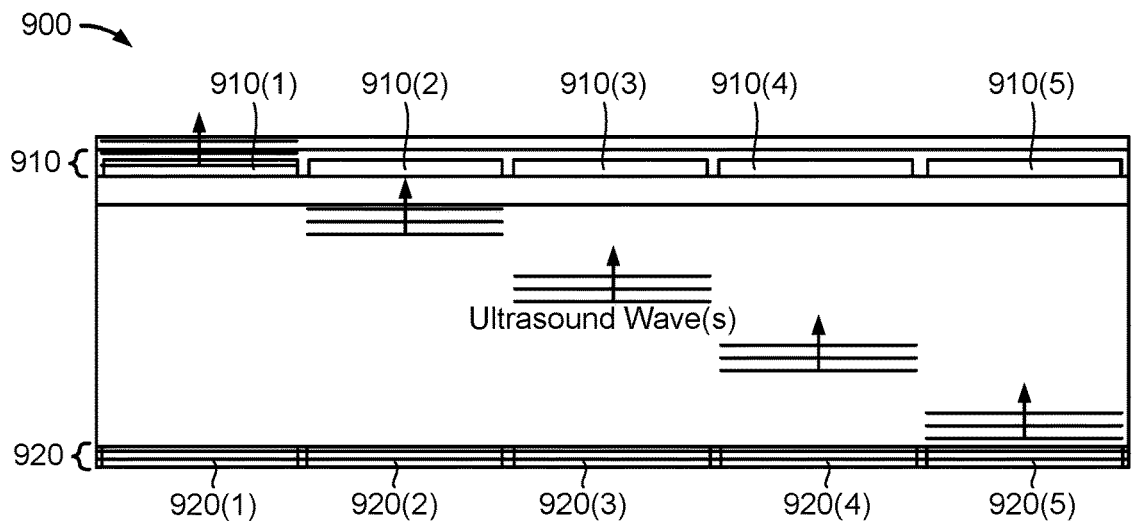
FIG. 9 illustrates an example of temporal phasing of transmission and reception of acoustic signals, according to an implementation.
Figure 9:
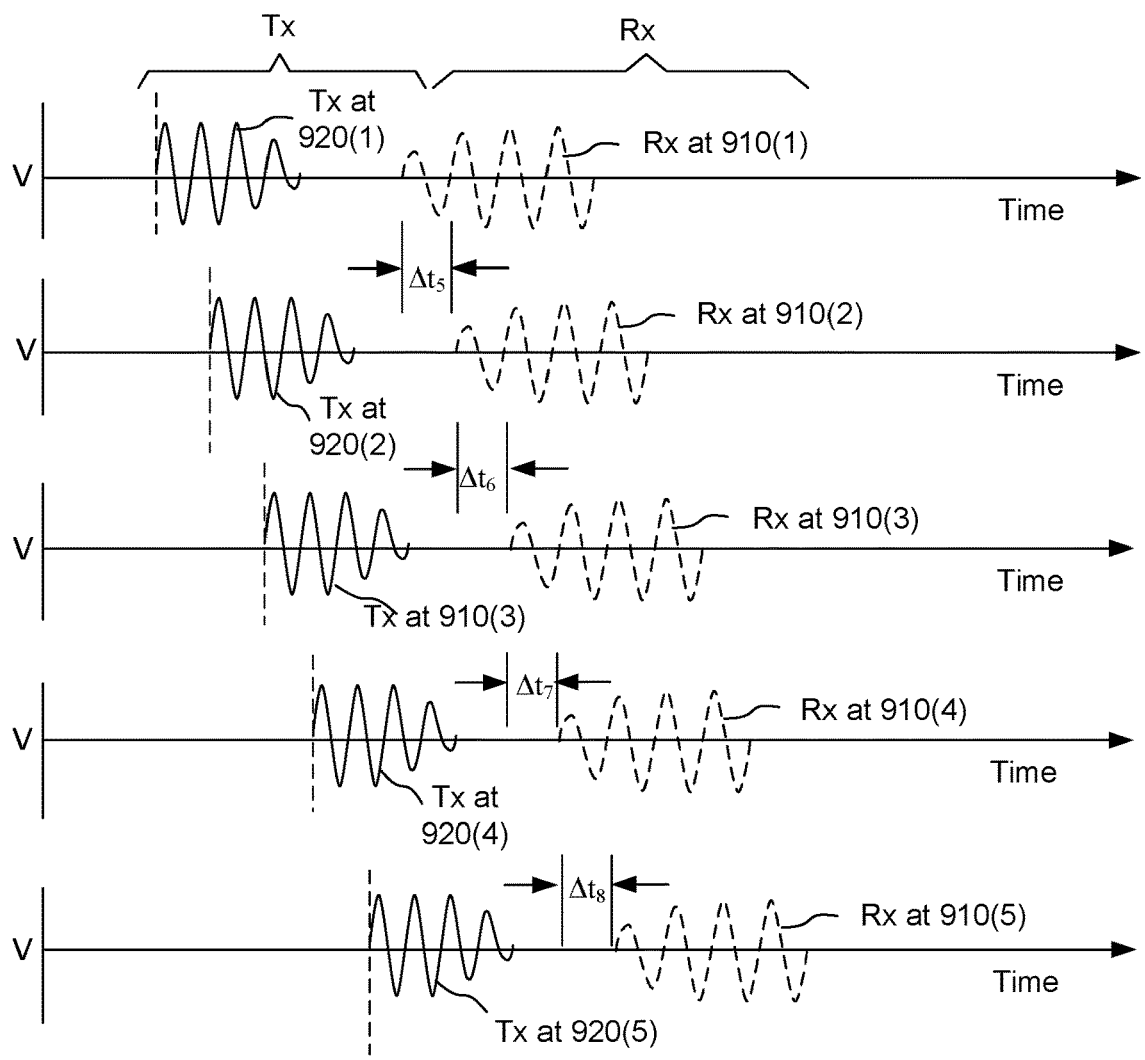

FIG. 9 illustrates an example of temporal phasing of transmission and reception of acoustic signals, according to an implementation. Referring first to Detail C, a conceptual cutaway view of an ultrasonic sensor system 900 is illustrated, according to an implementation. The ultrasonic sensor system 900 includes an array 910 of receivers and an array 920 of transmitters. In the illustrated implementation, the array 920 is approximately parallel with the array 910, but this is not necessarily so.

The array 920 of transmitters is segmented into separately controlled portions 920(i) that may be configured to undergo, non-simultaneous transmitter excitation cycles. As a result, and as illustrated in Detail D, acoustic signals may be launched at different times from each portion 920(i). As a result, acoustic signals reach portions 910(i) of the array of receivers at different times. Each portion 910(i) may correspond to a number of pixel elements. For example, in some implementations, each portion 910(i) includes a number of rows of pixel elements. In the illustrated example, if the ultrasonic array 900 includes an M×N array of 'M' rows and 'N' columns, each portion 910(i) may include approximately M/5 rows. In other implementations, each portion 910(i) may include approximately M/10 or M/20 rows, for example.

Referring now to Detail D, it may be observed that a temporal delay is established in the reception of acoustic signals at adjacent portions of the array 910. For example, the temporal delay between reception of acoustic signals at the first portion 910(1) and the second portion 910(2) is $\Delta t_5$. Similarly: the temporal delay between reception of acoustic signals at the second portion 910(2) and the third portion 910(3) is $\Delta t_6$; the temporal delay between reception of acoustic signals at the third portion 910(3) and the fourth portion 910(4) is $\Delta t_7$; and the temporal delay between reception of acoustic signals at the fourth portion 910(4) and the fifth portion 910(5) is $\Delta t_8$. The temporal delays $\Delta t_5$, $\Delta t_6$, $\Delta t_7$, and $\Delta t_8$ may be in the range of a few tens to hundreds of nanoseconds. In an implementation, temporal delays may each be 5-10% of the transmitter excitation cycle duration, for example, or about 25-50 nanoseconds. In some implementations, $\Delta t_5$, $\Delta t_6$, $\Delta t_7$, and $\Delta t_8$ may be approximately equal, but this is not necessarily so.

Figure 10:
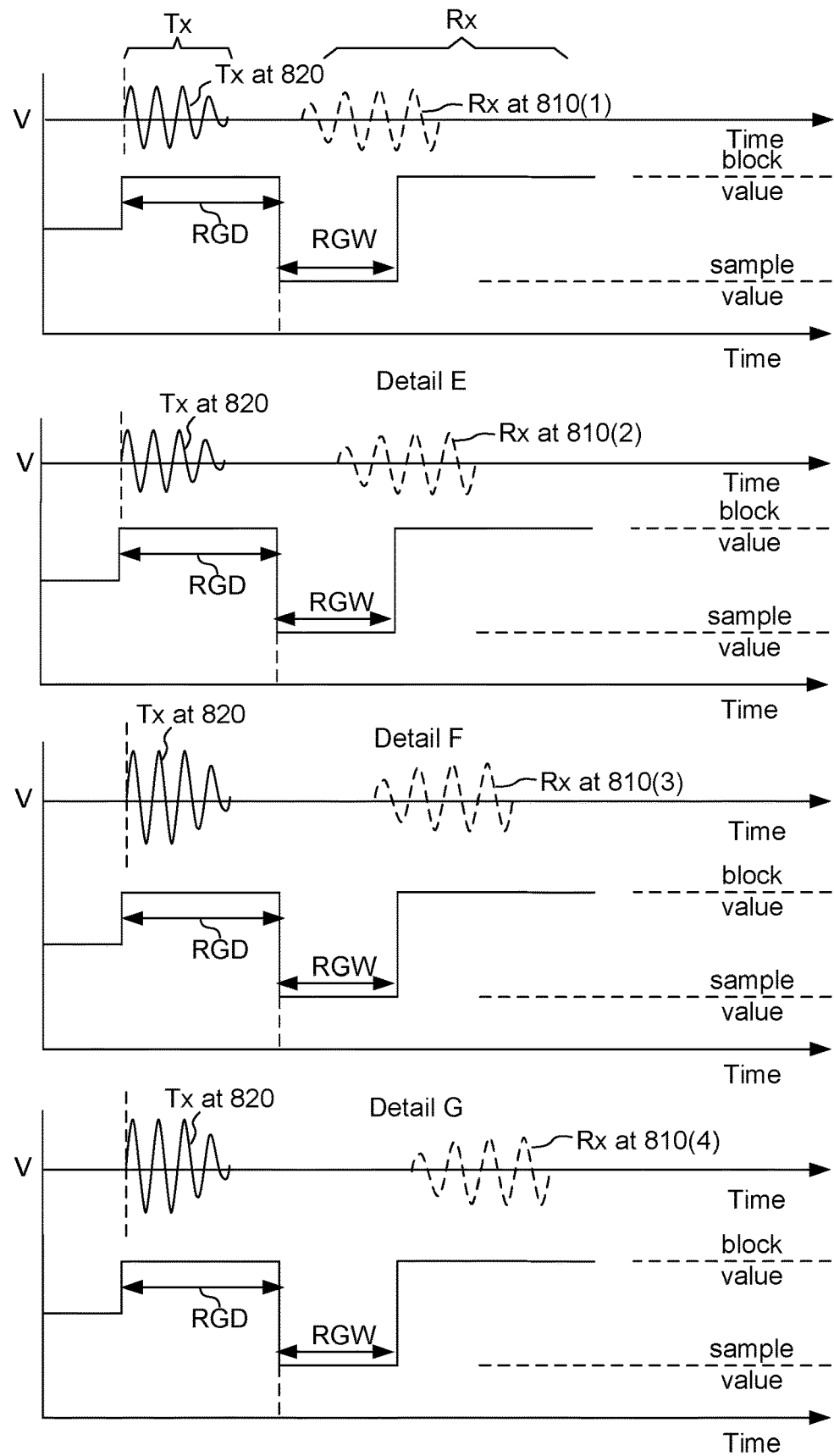
FIG. 10 graphically illustrates an example of transmitter excitation signals and receiver bias voltage levels as a function of time.

As indicated above, in connection with FIG. 7, a range gate window (RGW) may be established by setting an Rbias voltage level to a sample value. A sensor controller (e.g. sensor controller 570 of FIG. 5) may be configured to set the Rbias voltage level to the sample value. FIG. 10 graphically illustrates an example of transmitter excitation signals and receiver bias voltage levels as a function of time. As the illustrated example shows, in the absence of the presently disclosed techniques, an RGW period that is well aligned with acoustic signals received by the first portion 810(1) of receivers in array 810 (Detail E) is less well aligned with acoustic signals received by the second portion 810(2) of receivers in array 810 (Detail F), and misaligned with acoustic signals received by the third portion 810(3) (Detail G) and the fourth portion 810(4) (Detail H) of receivers in array 810.

Figure 11:
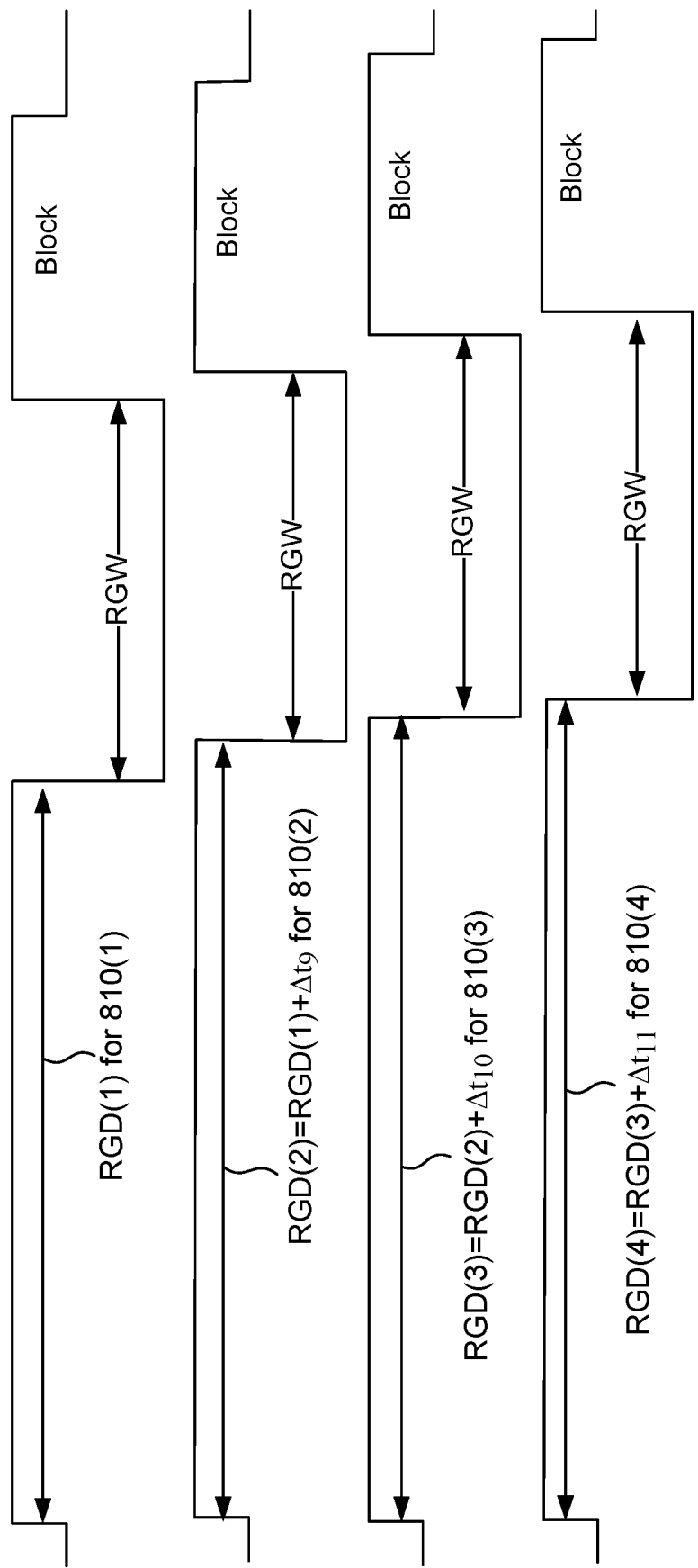
FIG. 11 illustrates a sliding range gate, in accordance with an implementation.

The present inventors have appreciated that the above noted problem can be mitigated by establishing a "sliding range gate" mode of operation. FIG. 11 illustrates a sliding range gate, in accordance with an implementation. In the illustrated implementation, a range gate delay (RGD) value is not uniform for all portions of receivers in the array. Consequently, RGW periods may start, for different portions of the receivers, at different moments in time. In the illustrated example, a first portion of receivers, e.g., portion 810(1) of array 810, has an RGW period that starts at time RGD(1); a second portion of receivers, e.g., portion 810(2) of array 810, has an RGW period that starts at a time RGD(2)=RGD(1)+$\Delta t_9$; a third portion of receivers, e.g., portion 810(3) of array 810, has an RGW period that starts at a time RGD(3)=RGD(2)+$\Delta t_{10}$; a fourth portion of receivers, e.g., portion 810(4) of array 810, has an RGW period that starts at a time RGD(4)=RGD(3)+$\Delta t_{11}$. In the illustrated implementation, temporal delays $\Delta t_9$, $\Delta t_{10}$ and $\Delta t_{11}$ are approximately equal, but this is not necessarily so. In an implementation, temporal delays $\Delta t_9$, $\Delta t_{10}$ and $\Delta t_{11}$ may each be 5-10% of an RGW period. In an implementation, temporal delays $\Delta t_9$, $\Delta t_{10}$ and $\Delta t_{11}$ may be each approximately 25-50 nanoseconds.

In an example implementation, an ultrasonic sensor array may include an M×N array of 'M' rows and 'N' columns. For example, a 1200×1600 array of nearly two million pixels may be contemplated. As a further example, a 1600×1800 array of nearly three million pixels may be contemplated. In some implementations, pixel rows are grouped in portions that include 5-25% of all rows. For example, for the 1200×1600 array, it may be contemplated to group the 1200 rows into ten portions, each portion including 120 rows. In such an implementation, a first portion of 120 rows may output receiver signals during an RGW that follows an RGD of, for example, 500 nanoseconds. A second portion of 120 rows may output receiver signals during a RGW that follows an RGD of, for example, 525 nanoseconds. A third portion of 120 rows may output receiver signals during a RGW that follows an RGD of, for example, 550 nanoseconds. Similarly, each successive one of the ten portions may be configured to have an RGW that is delayed by an additional 25 nanoseconds with respect to an immediately preceding portion. The tenth portion, accordingly, may output receiver signals during a RGW that follows an RGD of, 725 nanoseconds. Thus, each RGW is shifted (or "slid") temporally with respect to adjacent RGWs.

The sliding range gate mode of operation illustrated in FIG. 11 may be established by a sensor controller (e.g., sensor controller 570 of FIG. 5) for an ultrasonic sensor array (e.g., ultrasonic sensor array 502 of FIG. 5) including a number of ultrasonic sensor pixels (e.g., ultrasonic sensor pixels 534 of FIG. 5). As described above each sensor pixel may include a piezoelectric receiver layer (e.g., receiver layer 436 of FIG. 4) and a receiver bias electrode (e.g., receiver bias electrode 540 of FIG. 5). Each sensor pixel may be operable in one or both of a transmit mode of operation or a read mode of operation. The sensor controller, being electrically coupled with the receiver bias electrodes, may be configured to set, at each sensor pixel a RGW by applying to a respective receiver bias electrode, a modulated voltage bias that enables or disables the read mode of operation. The sensor controller may be further configured to establish different RGWs for different portions of the ultrasonic sensor array. More particularly, for example, the sensor controller may be configured to set, for a first portion of the ultrasonic sensor pixels, a first RGW and to set, for a second portion of the ultrasonic sensor pixels, a second RGW, and to establish a first temporal delay between the first RGW and the second RGW. More generally, where each portion is identified by an integer, 'k', the RGW of each portion k+1 may be delayed with respect to the RGW of portion k by a temporal delay.

Figure 12:
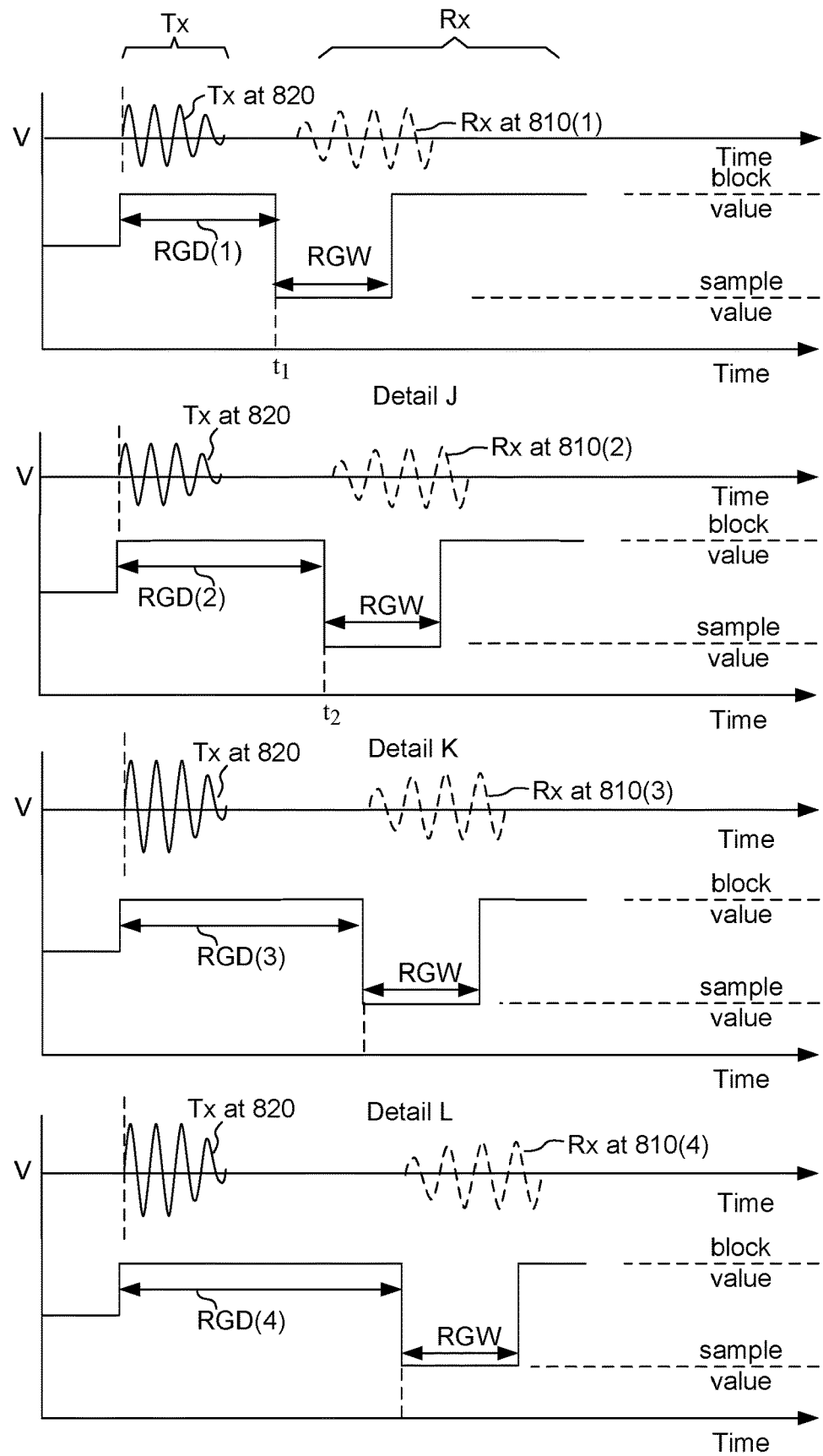
FIG. 12 graphically illustrates an example of transmitter excitation signals and receiver bias voltage levels as a function of time, in accordance with an implementation.

FIG. 12 graphically illustrates an example of transmitter excitation signals and receiver bias voltage levels as a function of time, in accordance with an implementation. As the illustrated example shows, the presently disclosed techniques provide an RGW period that is well aligned not only with acoustic signals received by the first portion 810(1) of receivers in array 810 (Detail J) but also with acoustic signals received by the second portion 810(2) (Detail K) the third portion 810(3) (Detail L) and the fourth portion 810(4) (Detail M) of receivers in array 810.

Although a portion of receivers (or region of the receiver), as the term is used herein, could be as small as one receiver, a size of each portion may advantageously be selected to be 5-25% of the total number of receivers for an array of the size contemplated by the present disclosure. For example, for a 1200×1600 array, ten portions of about 120 rows each may each have a respective RGW. The incremental delay step size between the start of each successive RGW may be about 25 nanoseconds in some implementations. As a result, each portion's RGW is not more than 25 nanoseconds from an optimal temporal location. The incremental delay step size between start of each successive RGW may be constant in some implementations. In other implementations a variable incremental delay step size may be contemplated.

Figure 13:
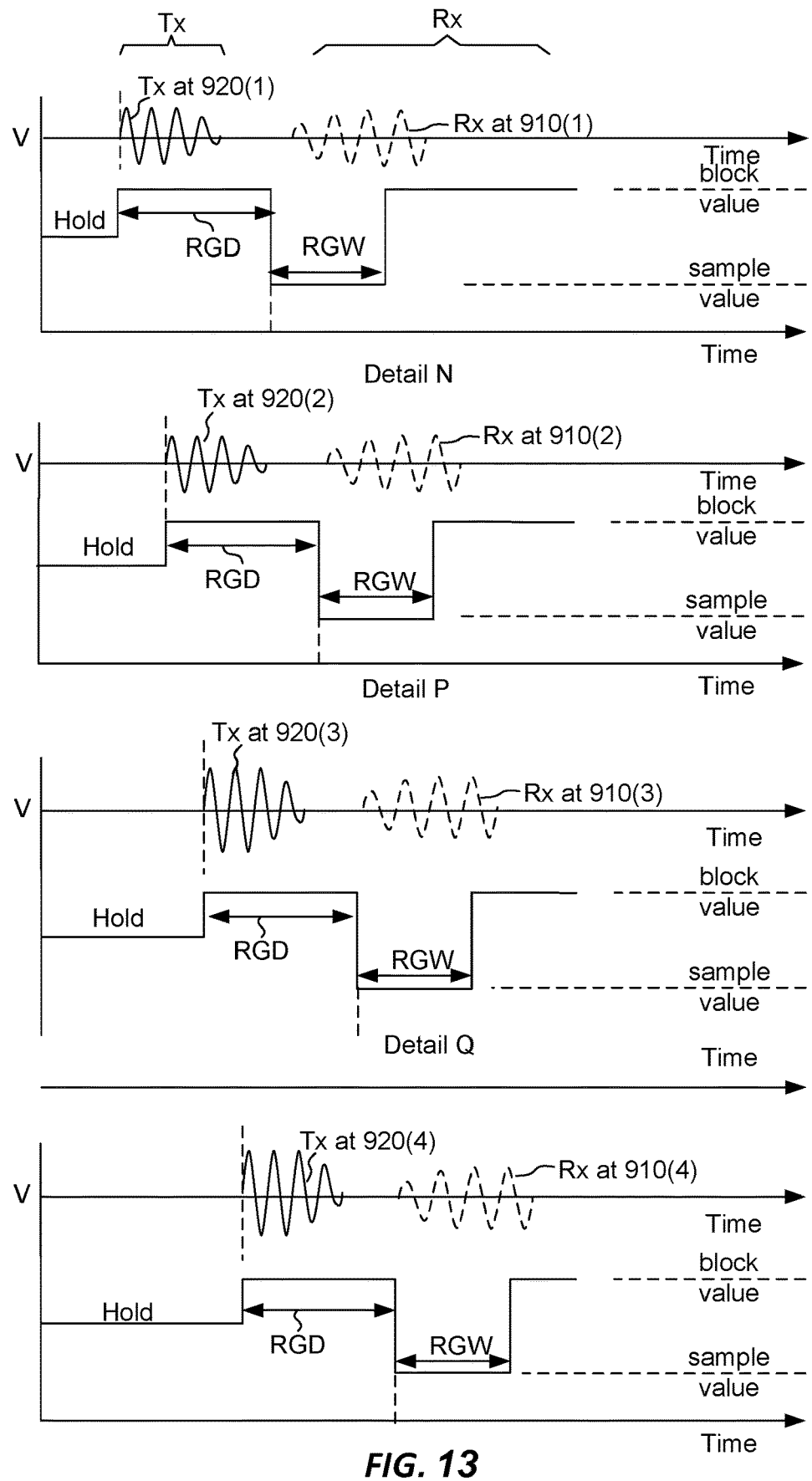
FIG. 13 graphically illustrates an example of transmitter excitation signals and receiver bias voltage levels as a function of time, in accordance with another implementation.

In the graphs depicted in FIG. 12, the RGD period starts, for each portion, at the same time, whereas the length of the RGD period gradually increases, so as to delay the start of the RGW period (comparing the RGW period of the second portion, Detail K, with the RGW period of the first portion, Detail J, for example). Alternatively or in addition, the start of one or more RGW periods may be delayed by increasing the duration of a preceding hold period. FIG. 13 graphically illustrates an example of transmitter excitation signals and receiver bias voltage levels as a function of time, in accordance with such an implementation. In the illustrated example, a start of each RGD is delayed, with respect to a preceding RGD. In the illustrated example, the duration of each RGW is approximately equal, but this is not necessarily so.

Figure 14:
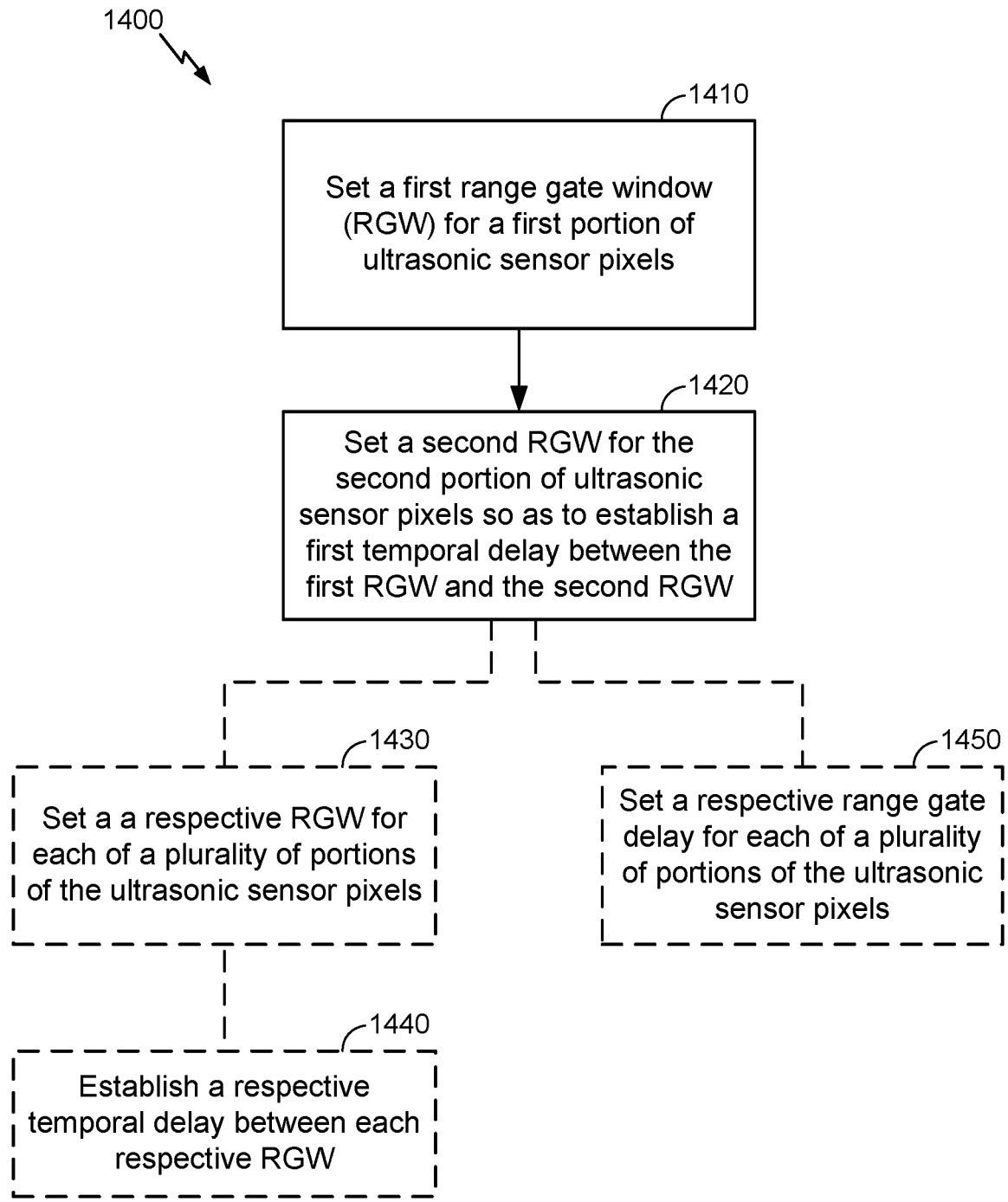
FIG. 14 illustrates an example of a process flow for operating an ultrasonic sensor array.

FIG. 14 illustrates an example of a process flow for operating an ultrasonic sensor array. As described hereinabove, the ultrasonic array may include a first portion of ultrasonic sensor pixels and a second portion of ultrasonic sensor pixels. The method 1400 includes a block 1410 of setting, with a sensor controller, a first range gate window (RGW) for the first portion of ultrasonic sensor pixels. As described hereinabove, each sensor pixel may include an ultrasonic receiver and a receiver bias electrode and is operable in one or both of a transmit mode of operation or a read mode of operation. The sensor controller may be electrically coupled with the receiver bias electrodes. Setting the first RGW may include modulating a bias voltage applied to the receiver bias electrode.

At block 1420, the sensor controller sets a second RGW for the second portion of ultrasonic sensor pixels so as to establish a first temporal delay between the first RGW and the second RGW. The ultrasonic sensor array may be configured to establish a temporal phasing of acoustic signals returned, as a result of interaction with a target object, to the ultrasonic sensor array such that the first portion of the ultrasonic sensor pixels receives the returned acoustic signals at a different time than the second portion of the ultrasonic sensor pixels.

Optionally, the method 1400 may include setting, at block 1430, for each of a plurality of portions of the ultrasonic sensor pixels, a respective RGW. Optionally, the method 1400 may further include establishing, at block 1440, a respective temporal delay between each respective RGW.

Alternatively or in addition the method 1400 may optionally include setting, at block 1450 a respective range gate delay (RGD) with the sensor controller, for each of a plurality of portions of the ultrasonic sensor pixels.

Thus, a system and method for introducing varying time delays in reflected ultrasonic signals received at different locations across an ultrasonic receiver for an ultrasonic sensor has been disclosed. It will be appreciated that a number of alternative configurations and operating techniques may be contemplated.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by or to control the operation of data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus comprising:
an ultrasonic transmitter configured to transmit an ultrasonic signal towards a platen interface;
an ultrasonic receiver comprising a plurality of receiver regions within the ultrasonic receiver, the plurality of receiver regions including at least a first receiver region and a second receiver region, the ultrasonic receiver configured to receive a reflection of the transmitted ultrasonic signal from the platen interface; and
an acoustic delay gradient layer disposed in an acoustic path between the ultrasonic transmitter and the ultrasonic receiver, the acoustic delay gradient layer configured to cause the reflection from the platen interface of the transmitted ultrasonic signal to reach the first receiver region at a first time and the reflection from the platen interface of the transmitted ultrasonic signal to reach the second receiver region at a second time that is different from the first time.

2. The apparatus of claim 1, wherein the acoustic delay gradient layer comprises a tapered layer having a taper angle, the taper angle of the tapered layer causing the reflection from the platen interface to reach the first receiver region after propagating over a first physical distance and the tapered layer causing the reflection from the platen interface to reach the second receiver region after propagating over a second physical distance different from the first physical distance.

3. The apparatus of claim 2, wherein the taper angle is less than a ten degree angle.

4. The apparatus of claim 1, wherein the acoustic delay gradient layer comprises a first acoustic delay gradient layer region corresponding to the first receiver region and a second acoustic delay gradient layer region corresponding to the second receiver region and wherein a first speed of sound propagating in the first acoustic delay gradient layer region and a second speed of sound propagating in the second acoustic delay gradient layer region are different.

5. The apparatus of claim 4, wherein the acoustic delay gradient layer comprises a first material in the first acoustic delay gradient layer region and a second material in the second acoustic delay gradient layer region.

6. The apparatus of claim 4, wherein the acoustic delay gradient layer comprises a glass layer and the glass layer in the first acoustic delay gradient layer region has a doping that is different from a doping of the glass layer in the second acoustic delay gradient layer region.

7. The apparatus of claim 1, wherein the acoustic delay gradient layer is disposed between the ultrasonic transmitter and the ultrasonic receiver.

8. The apparatus of claim 1, wherein the receiver is closer to the platen interface than the ultrasonic transmitter.

9. The apparatus of claim 1, wherein the ultrasonic transmitter is a non-segmented transmitter configured to transmit the ultrasonic signal towards the platen interface across an entirety of the non-segmented transmitter simultaneously.

10. The apparatus of claim 1, further comprising a controller configured to enable the first receiver region to measure the reflection of the transmitted ultrasonic signal during a first window beginning at a first window begin time and to enable the second receiver region to measure the reflection of the transmitted ultrasonic signal during a second window beginning at a second window begin time different from the first window begin time.

11. The apparatus of claim 10, wherein
the controller configured to enable the first receiver region to measure the reflection of the transmitted ultrasonic signal during a first window beginning at the first window begin time comprises the controller configured to control an application of a sample voltage to a receiver bias electrode corresponding to the first receiver region during a first range gate window beginning at the first window begin time, and
the controller configured to enable the second receiver region to measure the reflection of the transmitted ultrasonic signal during a second window beginning at the second window begin time comprises the controller configured to control the application of the sample voltage to a receiver bias electrode corresponding to the second receiver region during a second range gate window beginning at the second window begin time.

12. The apparatus of claim 1, wherein the apparatus is disposed within a mobile device.

13. A method for operating an ultrasonic sensor, the method comprising:
transmitting, by an ultrasonic transmitter of the ultrasonic sensor, an ultrasonic signal toward a platen interface of the ultrasonic sensor along an acoustic path that includes an acoustic delay gradient layer;
receiving a reflection of the transmitted ultrasonic signal reflected from the platen interface at a first receiver region of an ultrasonic receiver of the ultrasonic sensor at a first time; and
receiving the reflection of the transmitted ultrasonic signal reflected from the platen interface at a second receiver region of the ultrasonic receiver at a second time different from the first time.

14. The method of claim 13, wherein the transmitting the ultrasonic signal towards the platen interface comprises transmitting the ultrasonic signal through a tapered acoustic delay gradient layer having a taper angle, the taper angle causing the reflection from the platen interface to reach the first receiver region after propagating over a first physical distance and the tapered angle causing the reflection from the platen interface to reach the second receiver region after propagating over a second physical distance different from the first physical distance.

15. The method of claim 13, wherein the transmitting the ultrasonic signal toward the platen interface comprises transmitting the ultrasonic signal through a first acoustic delay gradient layer region corresponding to the first receiver region at a first speed of sound and transmitting the ultrasonic signal through a second acoustic delay gradient layer region corresponding to the second receiver region at a second speed of sound different from the first speed of sound.

16. The method of claim 13, wherein the transmitting the ultrasonic signal toward the platen interface comprises transmitting the ultrasonic signal through the acoustic delay gradient layer disposed between the ultrasonic transmitter and the ultrasonic receiver.

17. The method of claim 13, wherein the transmitting the ultrasonic signal toward the platen interface comprises transmitting the ultrasonic signal using a non-segmented transmitter configured to transmit the ultrasonic signal towards the platen interface across an entirety of the non-segmented transmitter simultaneously.

18. The method of claim 13, wherein
the receiving the reflection of the transmitted ultrasonic signal at the first receiver region at the first time comprises enabling the first receiver region to measure the reflection of the transmitted ultrasonic signal during a first window beginning at a first window begin time; and
the receiving the reflection of the transmitted ultrasonic signal at the second receiver region at the second time comprises enabling the second receiver region to measure the reflection of the transmitted ultrasonic signal during a second window beginning at a second window begin time different from the first window begin time.

19. The method of claim 18, wherein
enabling the first receiver region to measure the reflection of the transmitted ultrasonic signal during the first window beginning at the first window begin time comprises controlling an application of a sample voltage to a receiver bias electrode corresponding to the first receiver region during a first range gate window beginning at the first window begin time, and
enabling the second receiver region to measure the reflection of the transmitted ultrasonic signal during the second window beginning at the second window begin time comprises controlling the application of the sample voltage to a receiver bias electrode corresponding to the second receiver region during a second range gate window beginning at the second window begin time.

20. A mobile device comprising:
means for transmitting an ultrasonic signal toward a platen interface of an ultrasonic sensor along an acoustic path that includes means for introducing an acoustic delay gradient;
means for receiving a reflection of the transmitted ultrasonic signal reflected from the platen interface at a first receiver region of an ultrasonic receiver of the ultrasonic sensor at a first time; and
means for receiving the reflection of the transmitted ultrasonic signal reflected from the platen interface at a second receiver region of the ultrasonic receiver at a second time different from the first time.

21. The mobile device of claim 20, wherein the means for introducing the acoustic delay gradient comprises means for causing the reflection from the platen interface to reach the first receiver region after propagating over a first physical distance and means for causing the reflection from the platen interface to reach the second receiver region after propagating over a second physical distance different from the first physical distance.

22. The mobile device of claim 21, wherein the means for introducing the acoustic delay gradient comprises a tapered acoustic delay gradient layer.

23. The mobile device of claim 20, wherein the means for introducing the acoustic delay gradient comprises a means for causing the ultrasonic signal to travel at a first speed of sound along the acoustic path to the first receiver region and a means for causing the ultrasonic signal to travel at a second speed of sound different from the first speed of sound along the acoustic path to the second receiver region.

24. The mobile device of claim 23, wherein
the means for causing the ultrasonic signal to travel at the first speed of sound along the acoustic path to the first receiver region comprises a first acoustic delay gradient layer region comprising a first material; and
the means for causing the ultrasonic signal to travel at a second speed of sound along the acoustic path to the second receiver region comprises a second acoustic delay gradient layer region comprising a second material different from the first material.

25. The mobile device of claim 20, wherein the means for introducing the acoustic delay gradient is disposed between an ultrasonic transmitter and the ultrasonic receiver.

26. The mobile device of claim 20, wherein the means for transmitting the ultrasonic signal comprises a non-segmented transmitter configured to transmit the ultrasonic signal towards the platen interface across an entirety of the non-segmented transmitter simultaneously.

27. The mobile device of claim 20, wherein
the means for receiving the reflection of the transmitted ultrasonic signal at the first receiver region at the first time comprises means for enabling the first region to measure the reflection of the ultrasonic signal during a first window beginning at a first window begin time; and
the means for receiving the reflection of the transmitted ultrasonic signal at the second receiver region at the second time comprises means for enabling the second region to measure the reflection of the ultrasonic signal during a second window beginning at a second window begin time, different from the first window begin time.

28. A non-transitory computer readable medium storing instructions for execution by one or more processors of a mobile device to perform operations comprising:
controlling an ultrasonic transmitter of an ultrasonic sensor to transmit an ultrasonic signal toward a platen interface of the ultrasonic sensor along an acoustic path that includes an acoustic delay gradient layer;
enabling a first region of an ultrasonic receiver of the ultrasonic sensor to measure a reflection of the transmitted ultrasonic signal during a first window beginning at a first window begin time; and
enabling a second region of the ultrasonic receiver of the ultrasonic sensor to measure the reflection of the transmitted ultrasonic signal during a second window beginning at a second window begin time different from the first window begin time.

29. The non-transitory computer readable medium of claim 28, wherein
the operations comprising enabling the first region of the ultrasonic receiver of the ultrasonic sensor to measure the reflection of the transmitted ultrasonic signal during the first window beginning at the first window begin time comprises controlling the application of a sample voltage to a receiver bias electrode corresponding to the first receiver region during the first window, and
the operations comprising enabling the second region of the ultrasonic receiver of the ultrasonic sensor to measure the reflection of the transmitted ultrasonic signal during the second window beginning at the second window begin time comprises controlling the application of the sample voltage to a receiver bias electrode corresponding to the second receiver region during the second window.

30. The non-transitory computer readable medium of claim 28 wherein the operations comprising instructing an ultrasonic transmitter of an ultrasonic sensor to transmit an ultrasonic signal comprises instructing a non-segmented transmitter to transmit the ultrasonic signal across an entirety of the non-segmented transmitter simultaneously.

* * * * *